US011330669B2

(12) United States Patent
Lee et al.

(10) Patent No.: US 11,330,669 B2
(45) Date of Patent: May 10, 2022

(54) SCHEDULING APPARATUS AND METHOD FOR INTERFERENCE CONTROL IN MOBILE COMMUNICATION SYSTEM

(71) Applicant: Samsung Electronics Co., Ltd., Suwon-si (KR)

(72) Inventors: Dongwoo Lee, Suwon-si (KR); Seokseong Jeon, Suwon-si (KR); Younggoo Han, Suwon-si (KR); Jiyun Seol, Suwon-si (KR); Hyungtaig Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 247 days.

(21) Appl. No.: 16/690,726

(22) Filed: Nov. 21, 2019

(65) Prior Publication Data

US 2020/0170077 A1 May 28, 2020

(30) Foreign Application Priority Data

Nov. 23, 2018 (KR) .......................... 10-2018-0146437

(51) Int. Cl.
*H04W 88/10* (2009.01)
*H04W 72/08* (2009.01)
(Continued)

(52) U.S. Cl.
CPC ....... *H04W 88/10* (2013.01); *H04W 72/0446* (2013.01); *H04W 72/0453* (2013.01);
(Continued)

(58) Field of Classification Search
CPC . H04W 88/10; H04W 76/16; H04W 72/0446; H04W 72/0453; H04W 72/082; H04W 72/14

See application file for complete search history.

(56) References Cited

U.S. PATENT DOCUMENTS

2011/0096703 A1* 4/2011 Nentwig .............. H04B 7/2643
370/294
2012/0202540 A1* 8/2012 Lee ..................... H04W 72/082
455/501

(Continued)

FOREIGN PATENT DOCUMENTS

EP           3 700 277 A1    8/2020
KR   10-2017-0113473 A     10/2017

(Continued)

OTHER PUBLICATIONS

3GPP TR 37.863-01-01 V15.1.0 "Technical Specification Group Radio Access Network", Oct. 2, 2018.

(Continued)

*Primary Examiner* — Jeffrey M Rutkowski
*Assistant Examiner* — Jasper Kwoh
(74) *Attorney, Agent, or Firm* — Jefferson IP Law, LLP

(57) ABSTRACT

A scheduling apparatus and a method for interference control in a mobile communication system supporting a carrier aggregation or dual connectivity or multi-connectivity technology in which a terminal uses a plurality of frequency resources at the same time are provided. Specifically, a first base station in a wireless communication system includes a transceiver and a processor connected to the transceiver and configured to obtain resource information of a second base station transmitted by the second base station, determine a resource assignment pattern based on the resource information of the second base station, assign uplink (UL) resources of the LTE base station for an UL channel based on the resource assignment pattern to reduce interference, and assign uplink (UL) resources of the first base station for an UL channel based on the resource assignment pattern to reduce interference.

20 Claims, 25 Drawing Sheets

(51) Int. Cl.
*H04W 76/16* (2018.01)
*H04W 72/04* (2009.01)
*H04W 72/14* (2009.01)

(52) U.S. Cl.
CPC ......... *H04W 72/082* (2013.01); *H04W 72/14* (2013.01); *H04W 76/16* (2018.02)

(56) References Cited

U.S. PATENT DOCUMENTS

| | | | |
|---|---|---|---|
| 2014/0003363 A1* | 1/2014 | Hart | H04W 72/0453 370/329 |
| 2014/0010169 A1* | 1/2014 | Novak | H04W 72/085 370/329 |
| 2014/0301332 A1* | 10/2014 | Kim | H04L 5/0032 370/329 |
| 2015/0148050 A1* | 5/2015 | Siomina | H04L 27/2605 455/452.1 |
| 2015/0327280 A1 | 11/2015 | Zhang et al. | |
| 2016/0119840 A1 | 4/2016 | Loehr et al. | |
| 2016/0302209 A1 | 10/2016 | Behravan et al. | |
| 2018/0092081 A1* | 3/2018 | Chen | H04W 16/14 |
| 2018/0206243 A1 | 7/2018 | Andou et al. | |
| 2018/0352540 A1* | 12/2018 | Lee | H04L 5/0048 |
| 2019/0058516 A1* | 2/2019 | Yang | H04B 7/0626 |
| 2019/0280837 A1* | 9/2019 | Sano | H04W 72/0446 |
| 2019/0364449 A1* | 11/2019 | Yang | H04W 72/0446 |
| 2021/0127360 A1 | 4/2021 | Noh et al. | |

FOREIGN PATENT DOCUMENTS

| | | |
|---|---|---|
| WO | 2016-075046 A1 | 5/2016 |
| WO | 2019/031212 A1 | 2/2019 |

OTHER PUBLICATIONS

International Search Report dated Feb. 27, 2020, issued in an International Application No. PCT/KR2019/016022.
Huawei et al., 'Discussion on support of single UL transmission for NE-DC', R2-1817998, 3GPP TSG-RAN2 Meeting #104, Nov. 2, 2018; Spokane, USA. Section 2.
CMCC, 'Discussion on enhancements to support NR Backhaul links', R1-1811035, 3GPP TSG RAN WG1 Meeting #94bis, Sep. 29, 2018; Chengdu, China. Sections 1-3.
NTT DOCOMO et al., "IDC support for IMD and harmonics due to uplink transmission in MR-DC", 3GPP Draft, R2-1706453, 3rd Generation Partnership Project (3GPP), vol. RAN WG2, Qingdao, China, Jun. 27-2017-Jun. 29, 2017, Jun. 26, 2017, XP051300959.
Extended European Search Report dated Jul. 29, 2021, issued in European Patent Application No. 19888168.2.
Sony, LTE-NR Coexistence, 3GPP TSG RAN WG2 #99bis, R2-1711018, Sep. 28, 2017.
Huawei et al., Discussion on the remaining issues of LTE-NR DC and UL coexistence, 3GPP TSG RAN WG1 #AH, R1-1715429, Sep. 11, 2017.
Korean Office Action dated Jan. 3, 2022, issued in Korean Patent Application No. 10-2018-0146437.

* cited by examiner

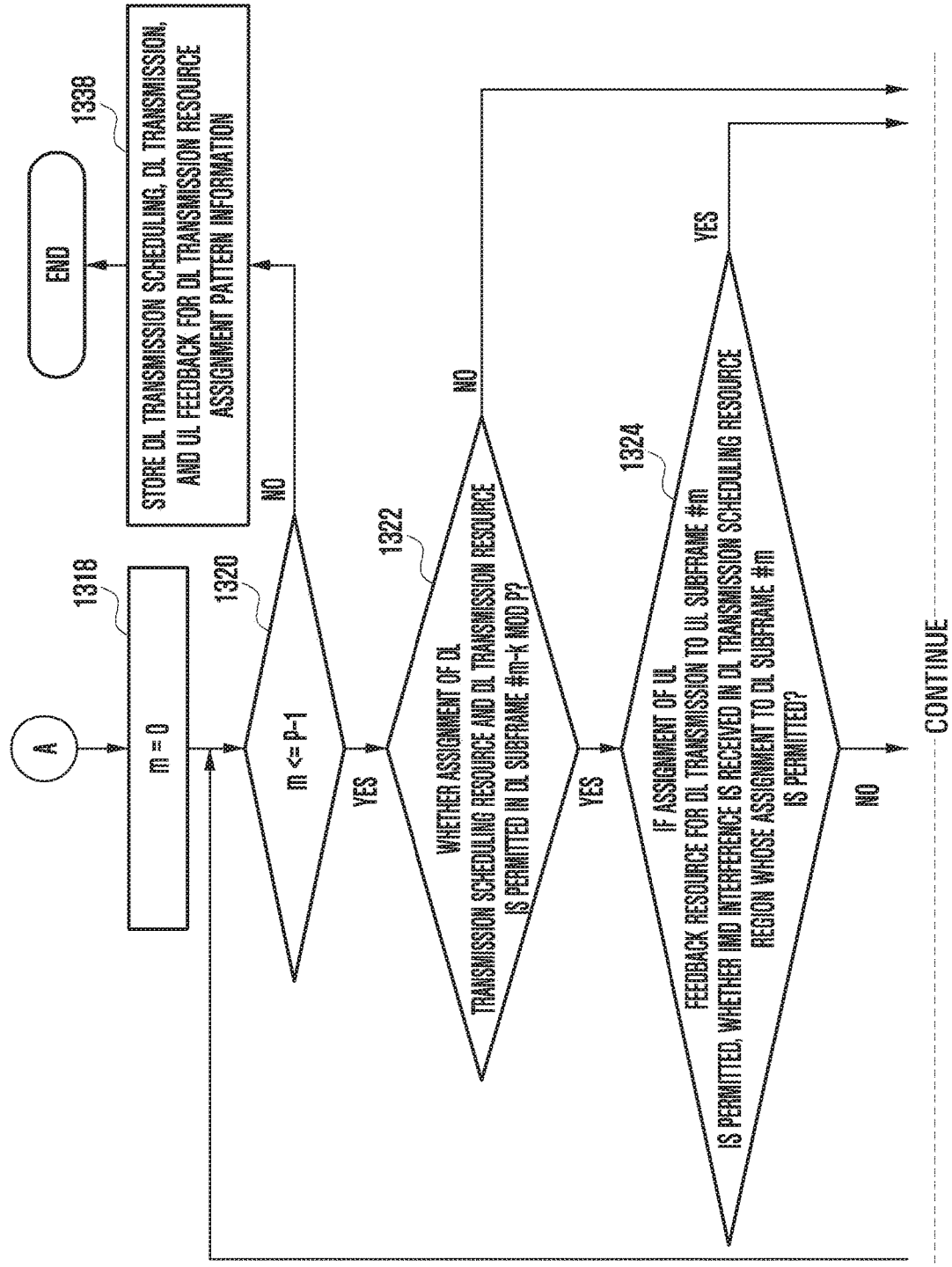

SCHEDULING APPARATUS AND METHOD FOR INTERFERENCE CONTROL IN MOBILE COMMUNICATION SYSTEM

CROSS-REFERENCE TO RELATED APPLICATION(S)

This application is based on and claims priority under 35 U.S.C. § 119(a) to Korean patent application number 10-2018-0146437, filed on Nov. 23, 2018, in the Korean Intellectual Property Office, the disclosure of which is incorporated by reference herein in its entirety.

BACKGROUND

1. Field

The disclosure relates to a scheduling apparatus and method for interference control in a mobile communication system supporting a carrier aggregation or dual connectivity or multi-connectivity technology in which a plurality of frequency resources is used at the same time.

2. Description of Related Art

A carrier aggregation technology is a technology for improving frequency use efficiency in a terminal or base station viewpoint by aggregating a plurality of component carriers located at different frequency bands and transmitting and receiving, by one terminal, signals using such component carriers at the same time.

A dual connectivity or multi-connectivity (hereinafter dual/multi-connectivity) technology is a technology for improving frequency use efficiency in a terminal or base station viewpoint in such a manner that one terminal is connected to a plurality of different base stations and transmits and receives signals using frequency resource within the plurality of base station located at different frequency bands at the same time.

Active and various studies are carried out on such carrier aggregation and dual/multi-connectivity technologies in the academic world and the industrial field since the technologies are introduced into the 3rd generation partnership project (3GPP) standard due to various technological advantages.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a terminal transmits and receives signals using resources on different frequency bands based on the carrier aggregation or dual connectivity or multi-connectivity, terminal reception performance may be degraded because an intra-terminal interference signal, such as harmonic interference or inter-modulation distortion (IMD), occurs in a specific frequency band reception stage of the terminal. Accordingly, there is a need for a method of controlling such an intra-terminal interference signal.

Additional aspects will be set forth in part in the description which follows and, in part, will be apparent from the description, or may be learned by practice of the presented embodiments.

In accordance with and aspect of the disclosure, a first base station in a wireless communication system is provided. The first base station includes a transceiver and a controller connected to the transceiver and configured to control to obtain resource assignment-related information of a second base station transmitted by the second base station and determine a resource assignment pattern based on the resource assignment-related information of the second base station. The first base station is a long term evolution (LTE) base station, the second base station is a new radio (NR) base station, and the first base station and the second base station control different cell groups and are capable of transmitting and receiving signals to and from a terminal simultaneously. The resource assignment-related information of the second base station includes at least one of information indicative of an uplink (UL) transmission-capable resource of the second base station and information indicative of a downlink (DL) transmission-capable resource of the second base station. The resource assignment pattern is for reducing interference by permitting some of UL assignment-capable resources of the first base station for an UL channel and permitting some of DL assignment-capable resources of the first base station for a DL channel.

Furthermore, the controller may be configured to further control to determine an UL channel resource of the terminal to be included in a resource of an UL channel of the determined resource assignment pattern when the terminal is scheduled and to determine a DL channel resource of the terminal to be included in a resource of a DL channel of the determined resource assignment pattern. Furthermore, the UL channel may include a physical uplink control channel (PUCCH) and a physical uplink shared channel (PUSCH), and the PUCCH and PUSCH may be located in independent resources on a time domain based on the resource assignment pattern. Furthermore, the DL channel may include a physical downlink channel (PDCCH) and a physical downlink shared channel (PDSCH).

Furthermore, the resource assignment pattern may include an UL transmission-related resource and a DL transmission-related resource. The UL transmission-related resource may be a resource for at least one of an UL grant, UL data and UL feedback information for the UL data. The DL transmission-related resource may be a resource for at least one of DL assignment, DL data and UL feedback information for the DL data. Furthermore, according to the resource assignment pattern, if the UL grant resource is present, the UL data resource corresponding to the UL grant may be present based on predetermined timing. If the DL assignment resource is present, the DL data corresponding to the DL assignment and the UL feedback information for the DL data resource may be present based on predetermined timing.

In accordance with another aspect of the disclosure, a second base station in a wireless communication system is provided. The second base station includes a transceiver and a controller connected to the transceiver and configured to control to identify a resource assignment pattern of the second base station and to transmit resource assignment pattern determination-related information to a first base station based on the resource assignment pattern. The first base station is an LTE base station, the second base station is a NR base station, and the first base station and the second base station control different cell groups and are capable of transmitting and receiving signals to and from a terminal simultaneously. The resource assignment pattern-related information may include at least one of information indicative of an UL transmission-capable resource of the second base station and information indicative of a DL transmission-capable resource of the second base station.

In accordance with another aspect of the disclosure, a base station in a wireless communication system is provided. The base station includes a transceiver and a controller connected to the transceiver and configured to control to obtain resource assignment pattern determination-related information, determine a resource assignment pattern based on the resource assignment pattern determination-related information, and schedule a terminal based on the determined resource assignment pattern. The resource assignment pattern is a set of information indicative of time-frequency resources to which an UL channel and a DL channel are capable of being allocated during a specific time interval. The resource assignment pattern is for reducing interference by permitting some of UL assignment-capable resources for an UL channel and permitting some of DL assignment-capable resources for a DL channel.

Furthermore, the resource assignment pattern may include an UL transmission-related resource and a DL transmission-related resource. The UL transmission-related resource may be a resource for at least one of an UL grant, UL data, and UL feedback information for the UL data. The DL transmission-related resource may be a resource for at least one of DL assignment, DL data, and UL feedback information for the DL data. Furthermore, the controller may be configured to further control to determine a resource assignment pattern of an UL transmission-related resource of the base station based on the resource assignment pattern determination-related information and to determine a resource assignment pattern of a DL transmission-related resource of the base station based on the resource assignment pattern of the UL transmission-related resource.

Furthermore, the controller may be configured to further control to determine an undetermined resource assignment pattern of a channel and signal based on a resource assignment pattern of the determined UL transmission-related resource and DL transmission-related resource of the base station. Furthermore, the controller may be configured to further control to determine whether resource assignment restriction based on the resource assignment pattern is applied to the terminal.

The disclosure can be applied to all terminals regardless of whether a terminal supports an interference control function in a mobile communication system supporting a carrier aggregation or a dual/multi-connectivity technology in which a plurality of frequency resources is used at the same time, can be flexibly implemented for various base station UL-DL configurations with relatively low complexity through the exception processing of an UL and DL scheduling operation of the existing scheduler, and can improve transmission and reception performance of a terminal and base station by controlling interference in an overall interference environment.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which:

FIG. 13B is a diagram describing a detailed operation based on a method for a serving cell (or cell group) whose scheduling and resource assignment are restricted to determine a DL transmission-related resource assignment pattern according to an embodiment of the disclosure;

FIG. 14 is a diagram illustrating a detailed example of resource assignment based on a method of determining a DL transmission-related resource assignment pattern according to an embodiment of the disclosure;

FIG. 18 is a diagram illustrating a detailed example of resource assignment based on a method of determining a DL transmission-related resource assignment pattern according to an embodiment of the disclosure;

Throughout the drawings, like reference numerals will be understood to refer to like parts, components, and structures.

DETAILED DESCRIPTION

Figure 1:
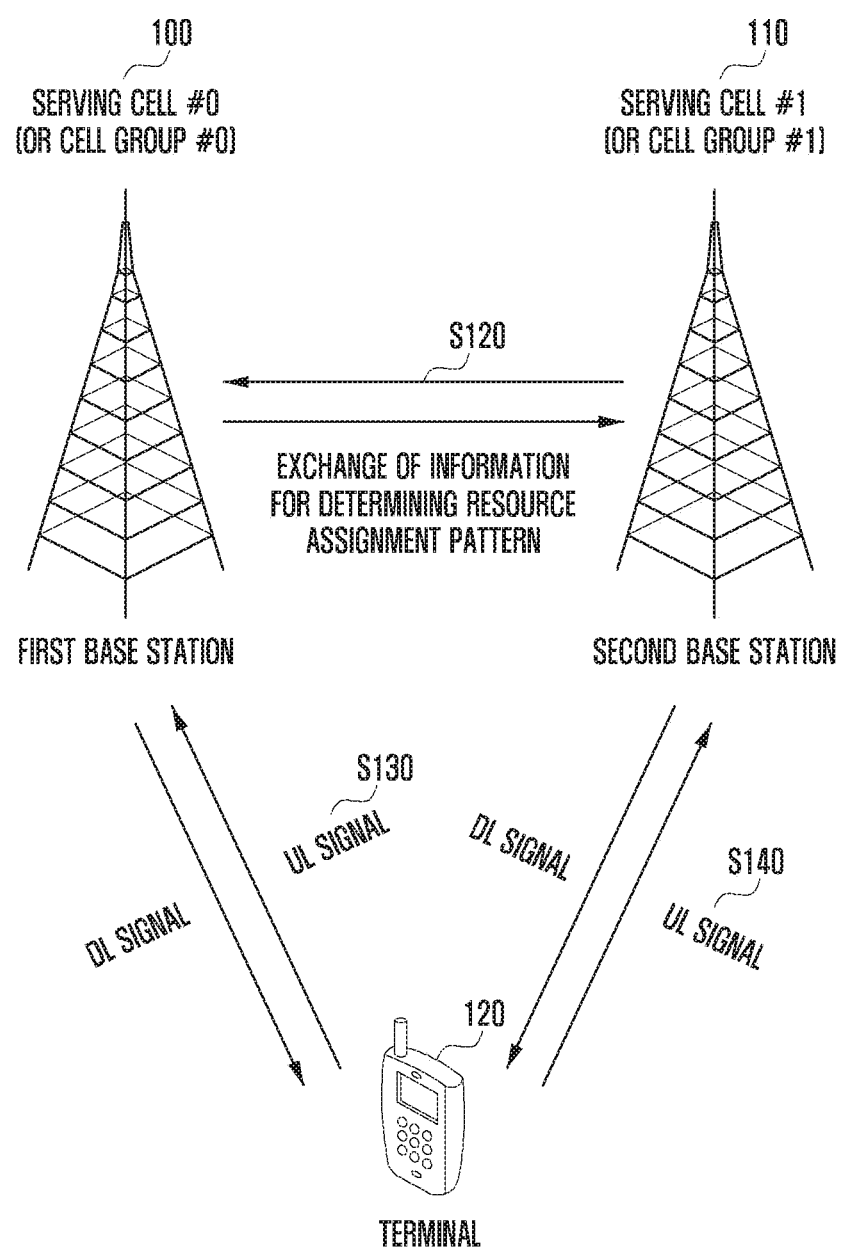
FIG. 1 is a diagram illustrating a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Furthermore, in describing the disclosure, a detailed description of a related known function or configuration will be omitted if it is deemed to make the gist of the disclosure unnecessarily vague. Furthermore, terms to be described hereunder have been defined by taking into consideration functions in the disclosure, and may be different depending on a user, an operator's intention or practice. Accordingly, each term should be defined based on contents over the entire specification.

Furthermore, in describing the embodiments of the disclosure in detail, a major gist of the disclosure may be slightly modified and applied to other communication systems having a similar technical background and a channel form without significantly departing from the range of the disclosure, which may be determined by a person having skilled technical knowledge in a corresponding technical field of the disclosure.

The merits and characteristics of the disclosure and a method of achieving the merits and characteristics will become more apparent from the embodiments described in detail in conjunction with the accompanying drawings. However, the disclosure is not limited to the disclosed embodiments, but may be implemented in various different ways. The embodiments are provided to only complete the disclosure and to allow those skilled in the art to fully understand the category of the disclosure. The disclosure is defined by the category of the claims. The same reference numerals will be used to refer to the same or similar elements throughout the drawings.

In the disclosure, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing apparatus, so that the instructions executed by the processor of the computer or other programmable data processing apparatus create means for executing the functions specified in the flowchart block(s). These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s). The computer program instructions may also be loaded on a computer or other programmable data processing apparatus to cause a series of operations to be performed on the computer or other programmable apparatus to produce a computer-executed process, so that the instructions performing the computer or other programmable apparatus provide operations for executing the functions described in the flowchart block(s).

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

The term "unit", as used in the embodiment means software or a hardware component, such as a field programmable gate array (FPGA) or an application-specific integrated circuit (ASIC), and the "unit" performs specific tasks. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operation on one or more central processing units (CPUs) within a device or a security multimedia card.

The disclosure a scheduling method for interference control in a mobile communication system supporting a carrier aggregation or dual connectivity or multi-connectivity (hereinafter referred to as a "dual/multi-connectivity" or "dual or multi-connectivity") technology in which a plurality of frequency resources is used at the same time, and an apparatus performing the same.

The carrier aggregation (CA) technology is a technology for improving frequency use efficiency in a terminal or base station viewpoint by aggregating a plurality of component carriers and by transmitting and receiving, by a terminal, signals using such component carriers at the same time. Specifically, according to the CA technology, a terminal and a base station may transmit and receive signals based on a broadband using a plurality of component carriers in uplink (UL) and downlink (DL). In this case, the component carriers are located in different frequency bands. Hereinafter, UL means a communication link through which a terminal transmits a signal to a base station, and DL means a communication link through which a base station transmits a signal to a terminal. In this case, the number of UL component carriers and the number of DL component carriers may be different.

The dual/multi-connectivity technology is a technology for improving frequency use efficiency in a terminal or base station viewpoint in such a manner that one terminal is connected to a plurality of different base stations and transmits and receives signals using frequency resource within the plurality of base station located at different frequency bands at the same time. A terminal may have been connected to a first base station (e.g., a base station that provides services using the long term evolution (LTE) technology or the 4th generation mobile communication technology) and a second base station (e.g., a base station that provides services using a new radio (NR) technology or a 5th generation mobile communication technology) at the same time. In this case, frequency resources used by the base stations may be located in different bands. In this case, the terminal may perform a radio resource control (RRC) connection through the first base station, may be served with a function (e.g., connection management or mobility management) provided in a control plane, and may be provided with an additional radio resource for transmitting and receiving data through the second base station. Such a dual connectivity technology may be called evolved universal terrestrial radio access (E-UTRA)-NR dual connectivity (EN-DC). The disclosure is not limited to such EN-DC and may be applied to all of EN-DC in which a first base station uses the NR technology and a second base station uses the LTE technology and various forms of multi-connectivity. Furthermore, the disclosure may be applied to the case of a carrier aggregation. Furthermore, the disclosure may be applied to a case where a first system using a first communication technology and a second system using second communication technology with respect to one apparatus have been implemented or a case where a first base station and a second base station are located at the same geographical location. In this case, the first communication technology and the second communication technology may be one of an LTE system and a NR system.

Active and various studies are carried out on such carrier aggregation and dual/multi-connectivity technologies in the academic world and the industrial field since the technologies are introduced into the 3rd generation partnership project (3GPP) standard due to various technological advantages.

Such carrier aggregation and a dual/multi-connectivity technologies have similarity in that one terminal transmits and receives signals using a plurality of frequency resources located in different frequency bands at the same time. However, if one terminal transmits and receives signals using a plurality of frequency resources located in different frequency bands at the same time, terminal reception performance may be degraded because an intra-terminal interference signal, such as harmonic interference or inter-modulation distortion (IMD), occurs in a specific frequency band reception stage of the terminal depending on a frequency combination and terminal hardware and an implementation characteristic.

In 3GPP Release 15 standard, a single uplink operation (SUO) technology has been introduced as a solution using a base station operation for IMD interference occurring in EN-DC. A SUO avoids IMD interference using a time division multiplexing (TDM)-based scheduling control method. According to the SUO technology, a base station designates a subframe in which a terminal may transmit an UL signal in an LTE frequency division duplex (FDD) system using an UL-DL configuration and hybrid automatic repeat request (HARQ) subframe offset applied to the existing LTE time division duplex (TDD) system so that the terminal does not generate IMD interference in an LTE FDD DL signal by transmitting an LTE FDD UL signal and an NR time division duplex TDD UL signal in the same subframe at the same time. The terminal can avoid IMD interference by performing LTE FDD UL signal transmission only in the designated subframe.

However, the SUO technology has a limited operation restriction on which it can be limitedly applied to only a terminal supporting the corresponding technology and it cannot be applied to a terminal not supporting the corresponding technology. Furthermore, in the case of an LTE base station, a terminal can transmit an acknowledgement (ACK) signal or non-acknowledgement (NACK) for DL HARQ only in a subframe capable of UL signal transmission. Accordingly, the terminal bundles and transmits HARQ ACK/NACK information for multiple DL subframes at a time. In this case, there is a need to develop an LTE base station operation for receiving and processing such an ACK/NACK signal. There is a disadvantage in that base station development complexity is very great because such a base station operation needs to be differently implemented depending on an UL-DL configuration of an NR TDD system. In addition, HARQ ACK/NACK signals for multiple DL subframes are transmitted using a physical uplink control channel (PUCCH) format 3 for transmitting a plurality of pieces of ACK/NACK information. There is an operational restriction by which efficiency of a PUCCH format 3 resource operation is degraded because the limited PUCCH format 3 resource must be used if a base station applies the SUO technology.

In order to solve such a problem, the disclosure provides a scheduling apparatus and method for interference control in a mobile communication system supporting a carrier aggregation or dual/multi-connectivity technology in which a plurality of frequency resources is used at the same time. The scheduling apparatus and method for interference control, provided by the disclosure, may be applied to all terminals regardless of whether a terminal supports an interference control function, and may be flexibly implemented for various base station UL-DL configurations with relatively low complexity through exception processing for the UL and DL scheduling operations of the existing scheduler. The transmission and reception performance of a terminal and base station can be improved by controlling interference in an overall interference environment through such a method and apparatus.

FIG. 1 is a diagram illustrating a wireless communication system according to an embodiment of the disclosure.

Referring to FIG. 1, the system performing the disclosure is configured with a plurality of base stations 100 and 110 supporting one or more serving cells or cell groups and a terminal 120 which transmits and receives signals using a plurality of frequency resources, located in different frequency bands supported by the plurality of base stations, at the same time. Specifically, the first base station 100 may control a serving cell #0 or a cell group #0, the second base station 110 may control a serving cell #1 or a cell group #1, and the terminal 120 may transmit and receive UL and DL signals at operations S130 and S140 to and from the two base stations. Furthermore, the two base stations may exchange information for determining a resource assignment pattern at operation S120. In FIG. 1, two base stations, each one supporting one serving cell or cell group in a different frequency band, and one terminal that transmits and receives signals using two frequency resources supported by the two base stations at the same time have been assumed, but the configuration and operation of the disclosure are not limited to the example.

Each of the base stations related to the disclosure provides some of or all the following functions.

A base station supports a carrier aggregation technology or a dual connectivity technology or multi-connectivity technology within a base station or in the state in which the base station is connected to a plurality of base stations.

When a terminal first accesses a base station or when a terminal accesses a base station having a frequency configuration different from that of the existing connected base station or when a terminal accesses a base station using a changed frequency configuration because frequency configuration information of the existing connected base station is changed, the base station may obtain, from the terminal, carrier aggregation and dual connectivity and multi-connectivity frequency combination information supportable by the terminal. Furthermore, the base station may obtain information on a frequency combination in which IMD interference may occur, among carrier aggregation and dual connectivity and multi-connectivity frequency combinations supportable by the terminal and obtained from the terminal. Furthermore, the base station may obtain, from the terminal, information on a frequency combination in which IMD interference occurs, among carrier aggregation and dual connectivity and multi-connectivity frequency combinations supportable by the terminal.

After a terminal accesses a specific base station, a base station may obtain, from the terminal, information on a frequency combination in which IMD interference occurs, among carrier aggregation and dual connectivity and multi-connectivity frequency combinations supportable by the terminal. Furthermore, the base station may obtain, from the terminal, information on a frequency combination in which IMD interference occurred, but the IMD interference has been solved, among carrier aggregation and dual connectivity and multi-connectivity frequency combinations supportable by the terminal.

A base station may exchange information, obtained from a specific terminal, for information for determining a resource assignment pattern between a plurality of serving cells or cell groups within a base station with respect to the specific terminal.

A base station may be connected to a plurality of base stations with respect to a specific terminal, and may exchange information, obtained from the terminal, for information for determining a resource assignment pattern between a plurality of serving cells or cell groups within a plurality of base stations.

A base station may provide a specific terminal with an assignment pattern for specific resources. Furthermore, the base station may configure whether to always apply resource assignment restriction based on a resource assignment pattern to the specific terminal. Furthermore, the base station may manage the specific terminal in the state in which it receives IMD interference or the state in which it does not receive IMD interference. Furthermore, the base station may operate resource assignment so that it is restricted or not restricted for each resource based on a resource assignment pattern with respect to the specific terminal.

A terminal related to the disclosure provides some of or all the following functions.

A terminal accesses one or more base stations and supports a carrier aggregation technology or a dual connectivity technology or multi-connectivity technology.

When a terminal first accesses a base station or when a terminal accesses a base station having a frequency configuration different from that of the existing connected base station or when a terminal accesses a base station using a changed frequency configuration because frequency configuration information of the existing connected base station is changed, the terminal may transmit, to the base station, carrier aggregation and dual connectivity and multi-connectivity frequency combination information supportable by the terminal. Furthermore, the terminal may transmit, to the base station, information on a frequency combination in which IMD interference may occur, among carrier aggregation and dual connectivity and multi-connectivity frequency combinations supportable by the terminal. Furthermore, the terminal may transmit, to the base station, information on a frequency combination in which IMD interference occurs, among carrier aggregation and dual connectivity and multi-connectivity frequency combinations supportable by the terminal.

After a terminal accesses a specific base station, the terminal may transmit, to the base station, information on a frequency combination in which IMD interference occurs, among carrier aggregation and dual connectivity and multi-connectivity frequency combinations supportable by the terminal. Furthermore, the terminal may transmit, to the base station, information on a frequency combination in which IMD interference occurred, but the IMD interference has been solved, among carrier aggregation and dual connectivity and multi-connectivity frequency combinations supportable by the terminal.

In the disclosure, an operation performed when a terminal first accesses a base station or when a terminal accesses a base station having a frequency configuration different from that of the existing connected base station or when a terminal accesses a base station using a changed frequency configuration because frequency configuration information of the existing connected base station is changed and an operation performed when a terminal first reports information on whether IMD interference occurs to a base station or when information on whether IMD interference occurs, reported from a terminal to a base station, is changed are described.

Furthermore, in the following specification, a case where IMD interference occurs has been described, but such a method may also be applied to a case where harmonic interference (HI) occurs. Methods described hereinafter may be understood and used as a method of removing or reducing IMD interference and/or HI.

Figure 2A:
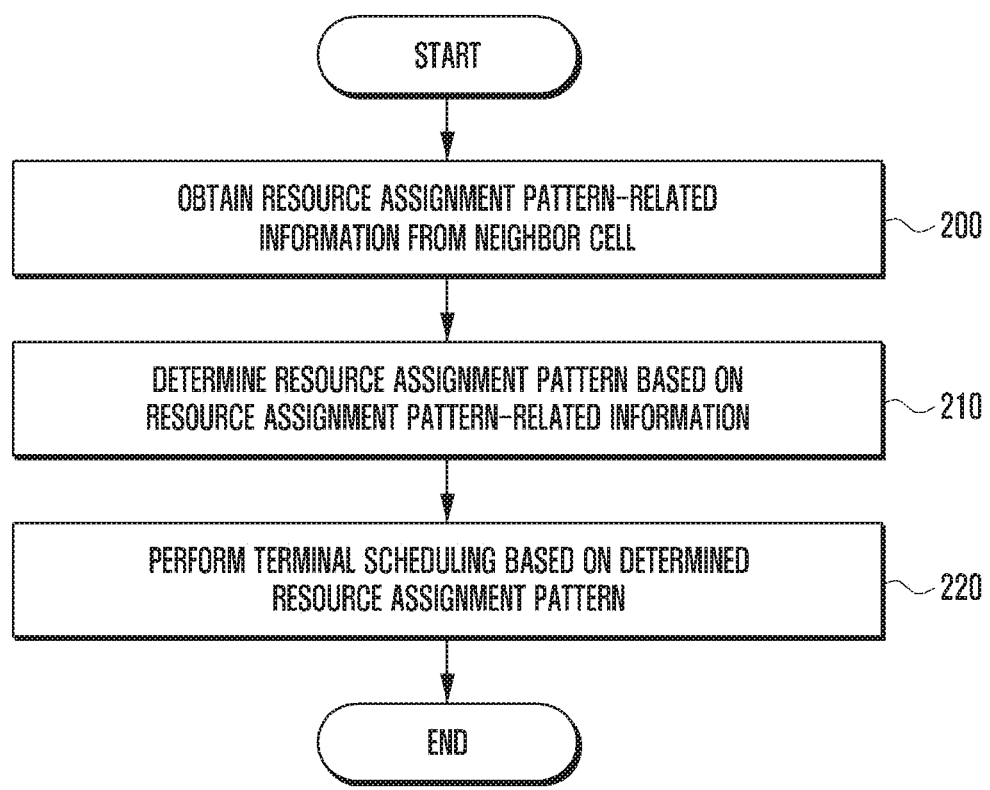
FIG. 2A is a diagram illustrating an operation for a base station to determine a resource assignment pattern and perform terminal scheduling.
Figure 2B:
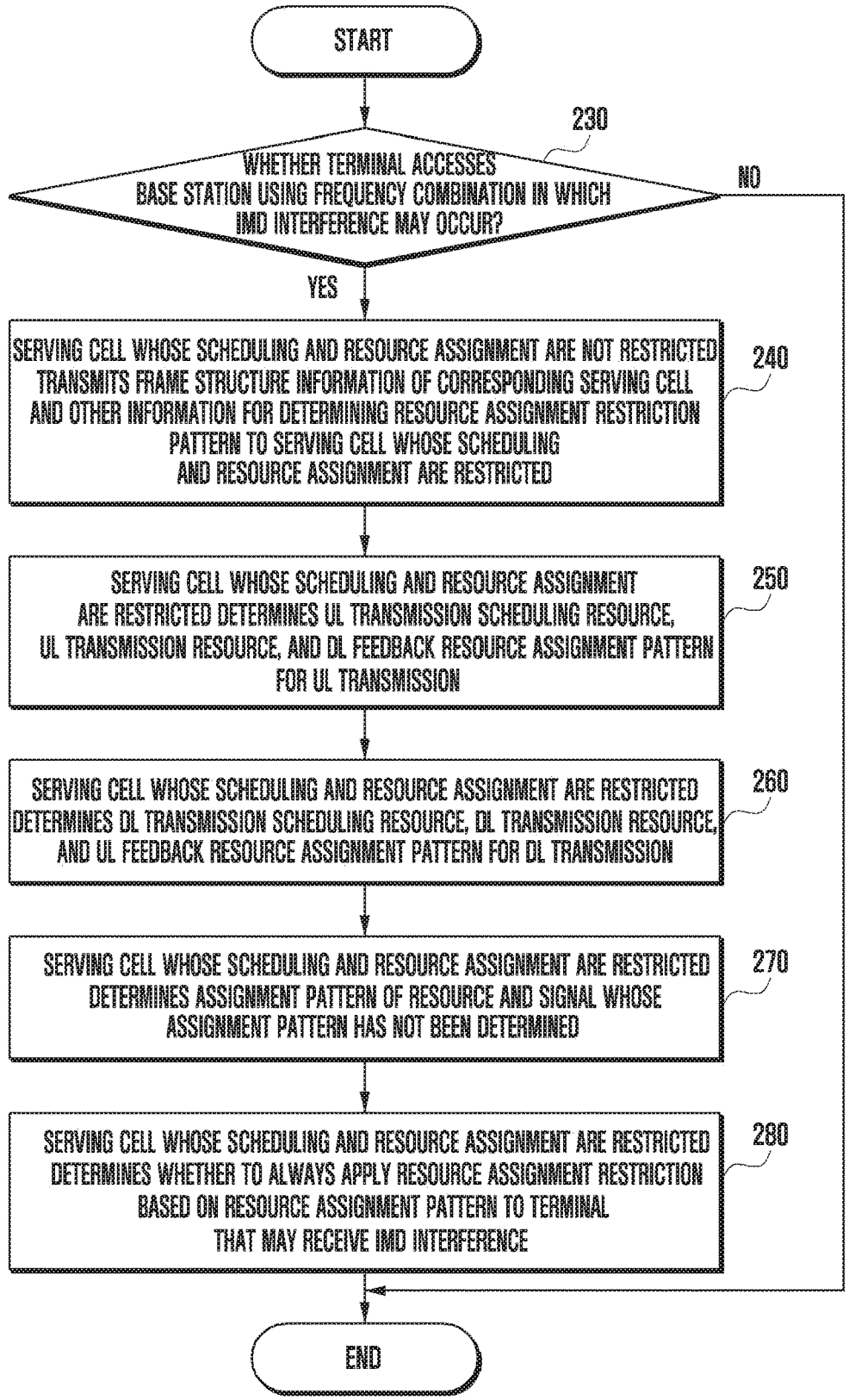
FIG. 2B is a detailed diagram illustrating an operation for a base station to determine a resource assignment pattern when a terminal first accesses a base station or when a terminal accesses a base station having a frequency configuration different from that of an existing connected base station or when a terminal accesses a base station using a changed frequency configuration because frequency configuration information of an existing connected base station is changed.

FIGS. 2A and 2B are diagrams illustrating operations of a base station when a terminal first accesses a base station or when a terminal accesses a base station having a frequency configuration different from that of the existing connected base station or when a terminal accesses a base station using a changed frequency configuration because frequency configuration information of the existing connected base station is changed according to various embodiments of the disclosure.

The operations of FIGS. 2A and 2B may be applied when there is a need to change a resource assignment pattern during access, such as that resource assignment information of a neighbor cell related to a previously determined resource assignment pattern is changed or the assignment resource of a channel and signal related to a previously determined resource assignment pattern is changed, in addition to the above-described case.

FIG. 2A is a diagram illustrating an operation for a base station to determine a resource assignment pattern and perform terminal scheduling.

Referring to FIG. 2A, the base station may obtain resource assignment pattern-related information of a neighbor cell from a base station that controls the neighbor cell at operation 200. Alternatively, the base station may identify resource assignment pattern-related information of another serving cell within the base station. The resource assignment pattern-related information may be assignment information of an UL and DL resource on a time-frequency resource, for example. The base station determines a resource assignment pattern based on the resource assignment pattern-related information the neighbor cell or another serving cell at operation 210. In this case, the base station may first determine the assignment pattern of the UL transmission-related resource, and may determine the assignment pattern of the DL transmission-related resource based on the UL transmission-related resource assignment pattern, which will be described in detail later. That is, by first determining the assignment pattern of the UL transmission-related resource, a source for IMD interference is determined, and the resource assignment pattern of the DL transmission-related resource is determined based on the determined interference source so that scheduling efficiency is maximized. Thereafter, the base station determines the assignment pattern of a resource and signal in addition to the UL and the DL transmission-related resources whose resource assignment pattern has been determined. Thereafter, the base station performs scheduling on a terminal based on the determined resource assignment pattern at operation 220. Thereafter, the base station transmits scheduling information for the terminal to the terminal.

Furthermore, although not illustrated, a base station that controls a neighbor cell may generate resource assignment pattern-related information of the neighbor cell, and may transmit the resource assignment pattern-related information to the base station. The base station that controls the neighbor cell determines its own resource assignment pattern, performs scheduling on the terminal based on the resource assignment pattern, and transmits scheduling information for the terminal to the terminal.

FIG. 2B is a detailed diagram illustrating an operation for a base station to determine a resource assignment pattern when a terminal first accesses a base station or when a terminal accesses a base station having a frequency configuration different from that of an existing connected base station or when a terminal accesses a base station using a changed frequency configuration because frequency configuration information of an existing connected base station is changed according to an embodiment of the disclosure.

Referring to FIG. 2B, the base station determines whether a terminal has accessed the base station using a frequency combination in which IMD interference may occur at operation 230. In embodiments of the disclosure, a frequency combination in which IMD interference may occur may mean a carrier aggregation, dual connectivity, and multi-connectivity frequency combination in which IMD interference may occur, which has been defined in the 3GPP standard. Furthermore, in embodiments of the disclosure, whether IMD interference is received or IMD interference occurs may mean that a terminal measures and investigates whether IMD interference is received or whether IMD interference occurs, and may mean that a terminal transmits and receives signals using a plurality of frequencies in which IMD interference is expected to occur based on frequency combination information in which IMD interference may occur, which has been defined in the 3GPP standard.

If the terminal does not access the base station using a frequency combination in which IMD interference may occur, thereafter, the base station does not perform an additional operation because IMD interference itself does not occur. However, if the terminal has accessed the base station using a frequency combination in which IMD interference may occur, thereafter, the base station performs additional operations because interference control over the IMD interference is necessary.

A serving cell (or cell group) (this may be understood as a base station that controls such a serving cell or cell group) whose scheduling and resource assignment are not restricted (or unrestricted) transmits, to a serving cell (or cell group) (this may be understood as a base station that controls such a serving cell or cell group) whose scheduling and resource assignment are restricted, at least one of frame structure information of the corresponding serving cell (or cell group), resource assignment-related information of the serving cell whose scheduling and resource assignment are not restricted, and information for determining a resource assignment restriction pattern at operation 240. Alternatively, such an operation may be substituted with an operation of determining the frame structure of a serving cell whose scheduling and resource assignment are not restricted within the same base station and other information for determining a resource assignment restriction pattern. In embodiments of the disclosure, the other information for determining a resource assignment, frequency combination information by which a corresponding terminal has accessed restriction pattern may include frequency combination information by a corresponding terminal a base station, information on whether IMD interference has been received in a specific frequency combination of a corresponding terminal, and subcarrier spacing (SCS) information of a corresponding serving cell. The resource assignment-related information of a serving cell whose scheduling and resource assignment are not restricted may include at least one of bitmap information on a radio bearer (RB) location capable of UL transmission for each subframe (or information on a resource location to which UL transmission has been assigned for each subframe) and bitmap information on an RB location capable of DL transmission for each subframe (or information on a resource location to which DL transmission has been assigned for each subframe).

The serving cell (or cell group) whose scheduling and resource assignment are restricted determines an UL transmission scheduling resource, an UL transmission resource, and a DL feedback resource assignment pattern for UL transmission based on the obtained information at operation 250. The UL transmission scheduling resource, UL transmission resource, and DL feedback resource for UL transmission may be called UL transmission-related resources. In embodiments of the disclosure, the UL transmission scheduling resource may mean an UL grant assigned to a physical downlink control channel (PDCCH) region in an LTE system that schedules UL data. The UL transmission resource may mean a physical uplink shared channel (PUSCH) in an LTE system in which UL data is transmitted. The DL feedback resource for UL transmission may mean a physical HARQ indicator channel (PHICH) in which HARQ ACK/NACK for a PUSCH is transmitted in an LTE system that transmits feedback for UL data. Furthermore, in an NR system, the UL transmission scheduling resource may be an UL grant assigned to a PDCCH region, and the UL transmission resource may be a PUSCH. In this case, the DL feedback resource for UL transmission may not be separately configured.

The UL transmission resource of a serving cell (or cell group) whose scheduling and resource assignment are unrestricted and the UL transmission-related resource assignment pattern of a serving cell (or cell group) whose scheduling and resource assignment are restricted are determined through such a process. Accordingly, the serving cell (or cell group) whose scheduling and resource assignment are restricted may identify information on a DL subframe in which IMD interference is obtained.

Operation 250 may be divided into an operation of determining a resource assignment pattern while permitting the occurrence of IMD interference and an operation of determining a resource assignment pattern while not permitting the occurrence of IMD interference, which will be described in detail layer.

Thereafter, the serving cell (or cell group) whose scheduling and resource assignment are restricted determines a DL transmission scheduling resource, a DL transmission resource, and an UL feedback resource assignment pattern for DL transmission at operation 260. The DL transmission scheduling resource, DL transmission resource, and UL feedback resource for DL transmission may be called DL transmission-related resources. In embodiments of the disclosure, the DL transmission scheduling resource may mean DL assignment to a PDCCH region in an LTE system that schedules DL data. The DL transmission resource may mean a physical downlink shared channel (PDSCH) in an LTE system to which DL data is transmitted. The UL feedback resource for a DL transmission resource may mean a PUCCH in which HARQ ACK/NACK for a PDSCH is transmitted in an LTE system that transmits feedback for DL data. Furthermore, in an NR system, the DL transmission scheduling resource may be DL assignment to a PDCCH region. The DL transmission resource may be a PDSCH. The UL feedback resource for a DL transmission resource may be a PUCCH.

That is, the serving cell (or cell group) whose scheduling and resource assignment are restricted assigns a DL transmission-related resource by avoiding IMD interference which may occur depending on DL transmission-related resource assignment because the UL transmission resource of a serving cell (or cell group) whose scheduling and resource assignment are unrestricted and the UL transmission-related resource assignment pattern of the serving cell (or cell group) whose scheduling and resource assignment are restricted have been previously determined. In this case, the serving cell (or cell group) whose scheduling and resource assignment are restricted determines a DL transmission-related resource assignment pattern so that scheduling efficiency of DL transmission is maximized.

Thereafter, the serving cell (or cell group) whose scheduling and resource assignment are restricted determines the assignment pattern of a resource and signal whose assignment pattern has not been determined at operation 270. The resource and signal whose assignment pattern has not been determined means a resource and signal that need to be assigned in addition to the predetermined UL transmission scheduling resource, UL transmission resource, DL feedback resource for UL transmission, DL transmission scheduling resource, DL transmission resource, and UL feedback resource for DL transmission.

Thereafter, the serving cell (or cell group) whose scheduling and resource assignment are restricted determines whether to always apply a resource assignment restriction based on a resource assignment pattern to a terminal that may receive IMD interference at operation 280. If the resource assignment restriction based on a resource assignment pattern is always applied, the serving cell (or cell group) whose scheduling and resource assignment are restricted performs detailed terminal scheduling based on the resource assignment pattern. The terminal scheduling means that a time-frequency resource based on each channel and signal assigned to a terminal is determined. After the terminal scheduling, the serving cell (or cell group) whose scheduling and resource assignment are restricted transmits scheduling information to the terminal. The scheduling information may be an UL grant, DL assignment and information indicative of other signal transmission resources.

The resource assignment pattern determined by the method may be understood as a set of pieces of time-frequency resource information to which a DL channel, UL channel and signal may be mapped for a specific time interval. Specifically, the resource assignment pattern may be understood as a set of time-frequency resource information for at least one of a PHICH in which feedback for UL data is transmitted, that is, a DL channel, a PDCCH in which an UL grant and DL assignment are transmitted, and a PDCCH in which DL data is transmitted, time-frequency resource information for at least one of a PUCCH in which feedback for DL data is transmitted, that is, an UL channel, and a PUSCH in which UL data is transmitted, and time-frequency resource information for the transmission of each reference signal and system information.

Hereinafter, a subframe means a unit for resource assignment, and may be interchangeably used with a slot, a mini-slot or a transmission time interval (TTI) or may be set as a pre-determined number of symbols. Furthermore, the number of symbols included in one subframe may be different depending on an SCS.

A method of determining the resource assignment pattern of an UL transmission-related resource is described below. The method of determining a resource assignment pattern may include a method of determining a resource assignment pattern while permitting the occurrence of IMD interference or a method of determining a resource assignment pattern while not permitting the occurrence of IMD interference.

Figure 3A:
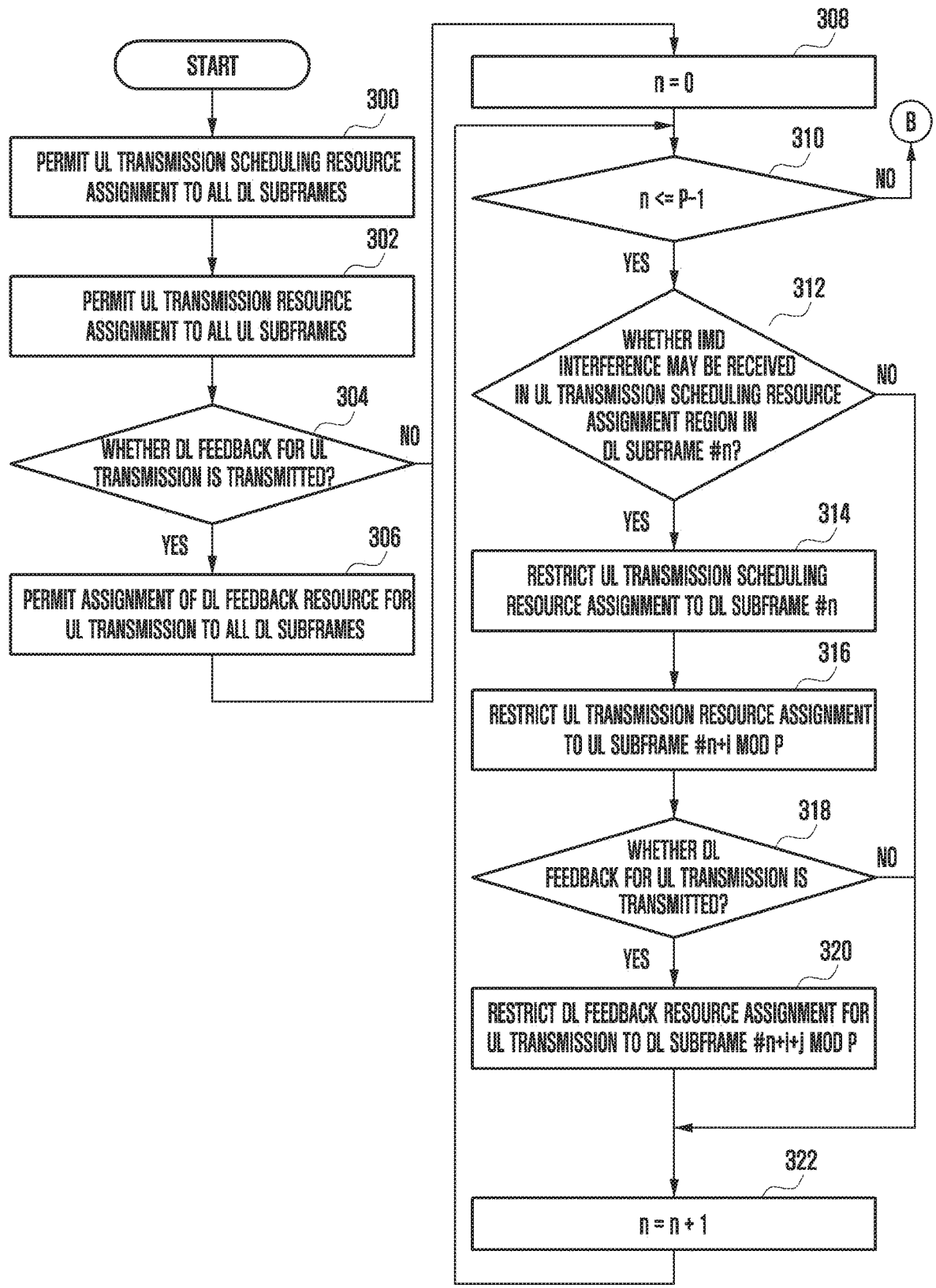
FIGS. 3A and 3B are a flowchart illustrating a method of determining an uplink (UL) transmission-related resource assignment pattern while permitting inter-modulation distortion (IMD) interference according to an embodiment of the disclosure.
Figure 3B:
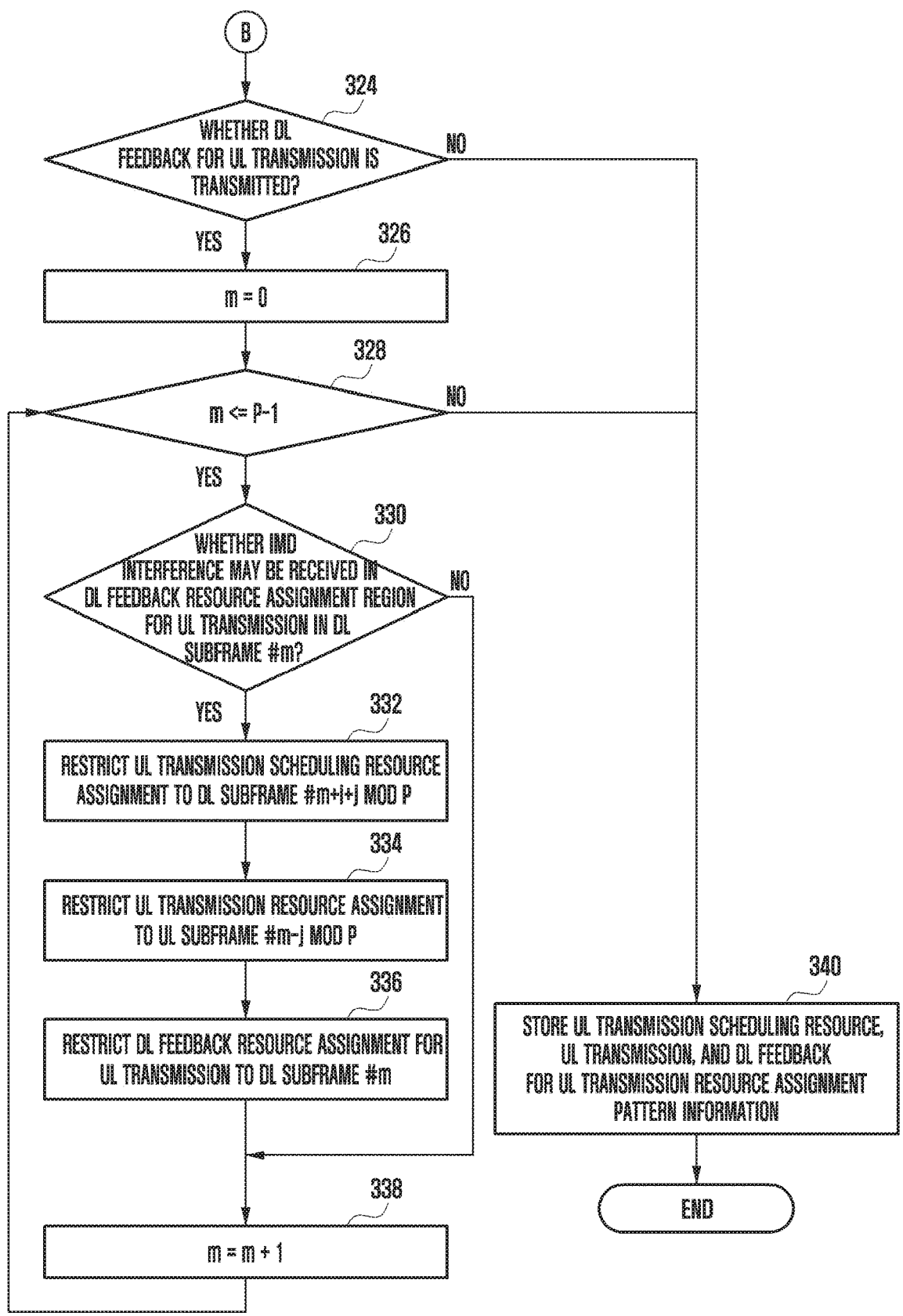

FIGS. 3A and 3B are a flowchart illustrating a method of determining an UL transmission-related resource assignment pattern while permitting IMD interference according to various embodiments of the disclosure.

Referring to FIGS. 3A and 3B, a process is illustrated for a serving cell (or cell group) whose scheduling and resource assignment are restricted to first permit UL transmission-related resource assignment to a DL and UL subframe, to second restrict (i.e., not assign) UL transmission scheduling resource assignment if a DL subframe in which IMD interference is received is present in an UL transmission scheduling resource when the UL transmission scheduling resource is assigned (based on the UL transmission resource of another cell or cell group) and restrict the assignment of an UL transmission resource and/or a DL feedback resource for UL transmission corresponding to the UL transmission scheduling resource, and to third restrict the assignment of an UL transmission scheduling resource and UL transmission resource and DL feedback resource for UL transmission corresponding to the DL feedback resource for UL transmission if a DL subframe in which IMD interference is received is present in a DL feedback resource for UL transmission when the DL feedback resource for UL transmission is assigned.

First, a serving cell (or cell group) whose scheduling and resource assignment are restricted permits UL transmission scheduling resource assignment to all DL subframes (or slots) at operation 300, and permits UL transmission resource assignment to all UL subframes (or slots) at operation 302. Thereafter, if DL feedback for UL transmission is transmitted at operation 304, the serving cell (or cell group) permits the assignment of a DL feedback resource for UL transmission to all the DL subframes (or slots) at operation 306. If DL feedback for UL transmission is not transmitted, operation 306 is not performed.

Thereafter, the serving cell (or cell group) whose scheduling and resource assignment are restricted divides all the resources in a resource assignment pattern unit having P subframes (or slots) as a cycle, and performs UL transmission scheduling resource assignment and UL transmission resource assignment and a DL feedback resource assignment restriction operation for UL transmission. In embodiments of the disclosure, in an LTE system, a unit of P indicative of the application cycle of a resource assignment pattern is 1 subframe. P may mean 10 corresponding to 1 radio frame and may mean 10 ms in terms of time.

The serving cell (or cell group) whose scheduling and resource assignment are restricted investigates whether IMD interference may be received in an UL transmission scheduling resource assignment region in an n-th DL subframe (or slot), while increasing n from 0 to P−1 by 1 in order to determine an UL transmission scheduling resource assignment and UL transmission resource assignment and DL feedback (for UL transmission) resource assignment pattern having the P subframes (or slots) as a cycle. Specifically, the serving cell (or cell group) whose scheduling and resource assignment are restricted sets n to 0 at operation 308. Thereafter, the serving cell (or cell group) checks whether n is smaller than or equal to P−1 at operation 310, and investigates whether IMD interference may be received in the UL transmission scheduling resource assignment region of the n-th DL subframe (or slot) if n is smaller than or equal to P−1 at operation 312.

If, as a result of the investigation into the reception of IMD interference, IMD interference cannot be received, the serving cell (or cell group) whose scheduling and resource assignment are restricted terminates the investigation into the n-th subframe and performs an investigation into a next (n+1)-th subframe. If the next (n+1)-th subframe is a P-th subframe, the serving cell (or cell group) performs operation 324 without an additional operation.

If, as a result of the investigation into the reception of IMD interference, IMD interference may be received, the serving cell (or cell group) whose scheduling and resource assignment are restricted restricts UL transmission scheduling resource assignment to the n-th DL subframe (or slot) at operation 314, restricts the assignment of an UL transmission resource to an (n+i) mod P-th UL subframe at operation 316, and determines whether DL feedback for UL transmission is transmitted at operation 318. In this case, if the serving cell (or cell group) whose scheduling and resource assignment are restricted transmits DL feedback for UL transmission, the serving cell (or cell group) whose scheduling and resource assignment are restricted restricts the assignment of a DL feedback resource for UL transmission to an (n+i+j) mod P-th DL subframe at operation 320. Accordingly, the serving cell (or cell group) whose scheduling and resource assignment are restricted terminates the investigation into the n-th subframe, and performs an investigation into the next (n+1)-th subframe. If the next (n+1)-th subframe is a P-th subframe, the serving cell (or cell group) performs operation 324 without an additional operation.

If the serving cell (or cell group) whose scheduling and resource assignment are restricted does not transmit DL feedback for UL transmission at operation 318, the serving cell (or cell group) whose scheduling and resource assignment are restricted terminates the investigation into the n-th subframe and performs an investigation into a next (n+1)-th subframe. If the next (n+1)-th subframe is a P-th subframe, the serving cell (or cell group) whose scheduling and resource assignment are restricted performs operation 324 without an additional operation.

In embodiments of the disclosure, if an UL transmission scheduling resource is assigned to a DL subframe #n, an index i indicative of a subframe difference taken for a corresponding UL transmission resource to be assigned to an UL subframe #n+i may be 4 in an LTE system. In this case, a time difference for the 4-subframe difference may mean 4 ms. Furthermore, if an UL transmission resource is assigned to an UL subframe #n+i, an index j indicative of a subframe difference taken for a corresponding DL feedback resource to be assigned to a DL subframe #n+i+j may be 4 in an LTE system. In this case, a time difference for the 4-subframe difference may mean 4 ms. In an NR system, such i and j are values which may be randomly set by a base station within a range defined in the 3GPP standard. A serving cell (or cell group) whose scheduling and resource assignment are restricted may determine an UL transmission-related resource by considering such i and j values in the same manner.

Thereafter, the serving cell (or cell group) whose scheduling and resource assignment are restricted determines whether a serving cell (or cell group) whose scheduling and resource assignment are restricted transmits DL feedback for UL transmission at operation 324. In this case, if the serving cell (or cell group) whose scheduling and resource assignment are restricted does not transmit DL feedback for UL transmission, the serving cell (or cell group) performs operation 340. If the serving cell (or cell group) whose scheduling and resource assignment are restricted transmits DL feedback for UL transmission, the serving cell (or cell group) whose scheduling and resource assignment are restricted investigates whether IMD interference may be received in a DL feedback resource assignment region for UL transmission in an m-th DL subframe (or slot), while increasing m from 0 to P−1 by 1 in order to determine an UL transmission scheduling resource assignment and UL transmission resource assignment and DL feedback (for UL transmission) resource assignment pattern having P as a cycle.

Specifically, the serving cell (or cell group) whose scheduling and resource assignment are restricted sets m=0 at operation 326, and then checks whether m is smaller than or equal to P−1 at operation 328. If m is smaller than or equal to P−1, the serving cell (or cell group) investigates whether IMD interference may be received in a DL feedback resource assignment region for UL transmission in an m-th DL subframe (or slot) at operation 330. If, as a result of the investigation into the reception of IMD interference, IMD interference cannot be received, the serving cell (or cell group) whose scheduling and resource assignment are restricted terminates the investigation into the m-th subframe and performs an investigation into a next (m+1)-th subframe. If the next (m+1)-th subframe is a P-th subframe at operation 328, the serving cell (or cell group) performs operation 340 without an additional operation.

If, as a result of the investigation into the reception of IMD interference, IMD interference may be received, the serving cell (or cell group) whose scheduling and resource assignment are restricted restricts UL transmission scheduling resource assignment to a (m−i−j) mod P-th DL subframe (or slot) at operation 332, restricts UL transmission resource assignment to an (m−j) mod P-th UL subframe (or slot) at operation 334, and restricts the assignment of a DL feedback resource for UL transmission to an m-th DL subframe (or slot) at operation 336. Accordingly, the serving cell (or cell group) whose scheduling and resource assignment are restricted terminates the investigation into the m-th subframe, and performs an investigation into a next (m+1)-th subframe. If the next (m+1)-th subframe is a P-th subframe, the serving cell (or cell group) performs operation 340 without an additional operation.

Thereafter, at operation 340, the serving cell (or cell group) whose scheduling and resource assignment are restricted stores UL transmission scheduling resource, UL transmission resource, and DL feedback (for UL transmission) resource assignment pattern information, determined based on whether IMD interference is received in an UL transmission scheduling resource assignment region and whether IMD interference is received in a DL feedback resource assignment region for UL transmission. Accordingly, the process of determining an UL transmission scheduling resource, an UL transmission resource, and a DL feedback (for UL transmission) resource assignment pattern is terminated. In this case, the resource assignment pattern information is defined for contiguous P subframes (or slots) as described above.

The operations illustrated in FIGS. 3A and 3B do not need to be sequentially performed in the sequence illustrate din FIGS. 3A and 3B. The order of the operations may be changed or the operations may be omitted, and such a change or omission may be construed as being included in the scope of the disclosure if there is an effect intended by the disclosure by the change or omission.

Furthermore, in the disclosure, a serving cell (or cell group) whose scheduling and resource assignment are unrestricted may borrow an NR system, and a serving cell (or cell group) whose scheduling and resource assignment are restricted may borrow an LTE system, but the disclosure is not limited thereto. A serving cell (or cell group) whose scheduling and resource assignment are not restricted or restricted may borrow one of an LTE system and an NR system. Alternatively, in the disclosure, a serving cell (or cell group) whose scheduling and resource assignment are unrestricted may be based on a system that performs high-speed data transmission, and a serving cell (or cell group) whose scheduling and resource assignment are restricted may be based on a system that performs low-speed data transmission. However, the interpretation of the disclosure is not limited to such embodiments, and may be used between systems that perform high-speed data transmission or between systems that perform low-speed data transmission. A serving cell (or cell group) whose scheduling and resource assignment are restricted may be a system that performs high-speed data transmission, and a serving cell (or cell group) whose scheduling and resource assignment are unrestricted may be a system that performs low-speed data transmission.

Figure 4:
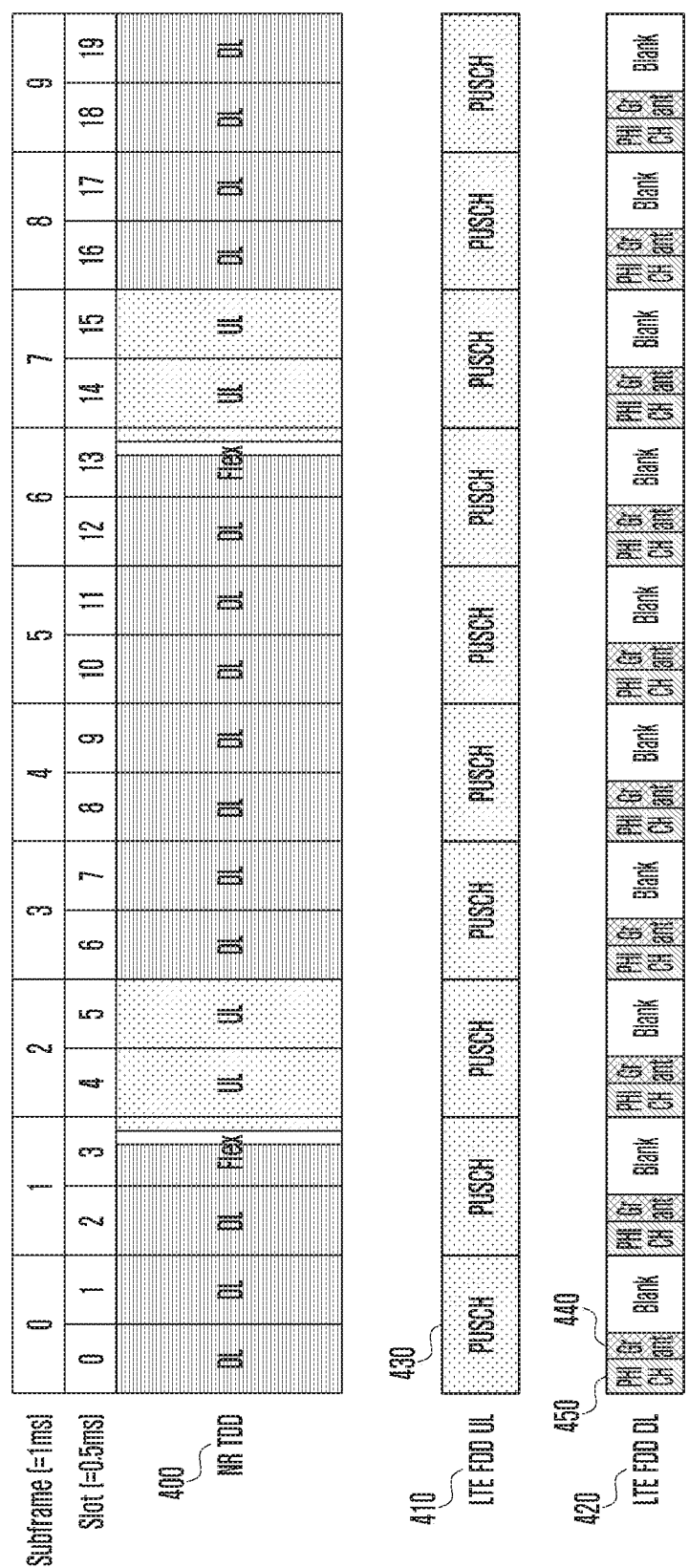
FIG. 4 is a diagram illustrating a detailed example of resource assignment based on a method of determining a resource assignment pattern while permitting the occurrence of IMD interference according to an embodiment of the disclosure.
Figure 6:
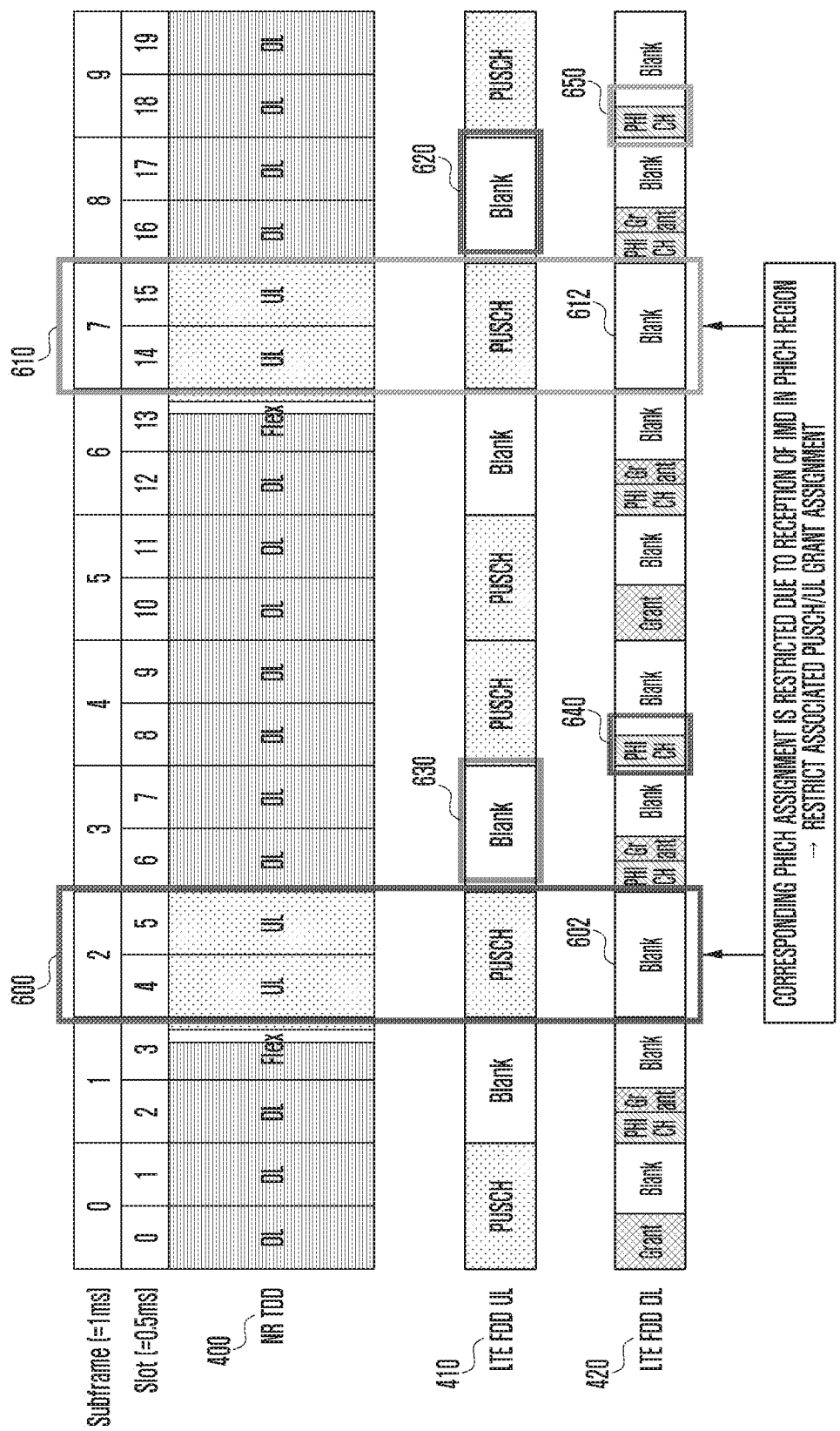
FIG. 6 is a diagram illustrating a detailed example of resource assignment based on a method of determining a resource assignment pattern while permitting IMD interference according to an embodiment of the disclosure.
Figure 7:
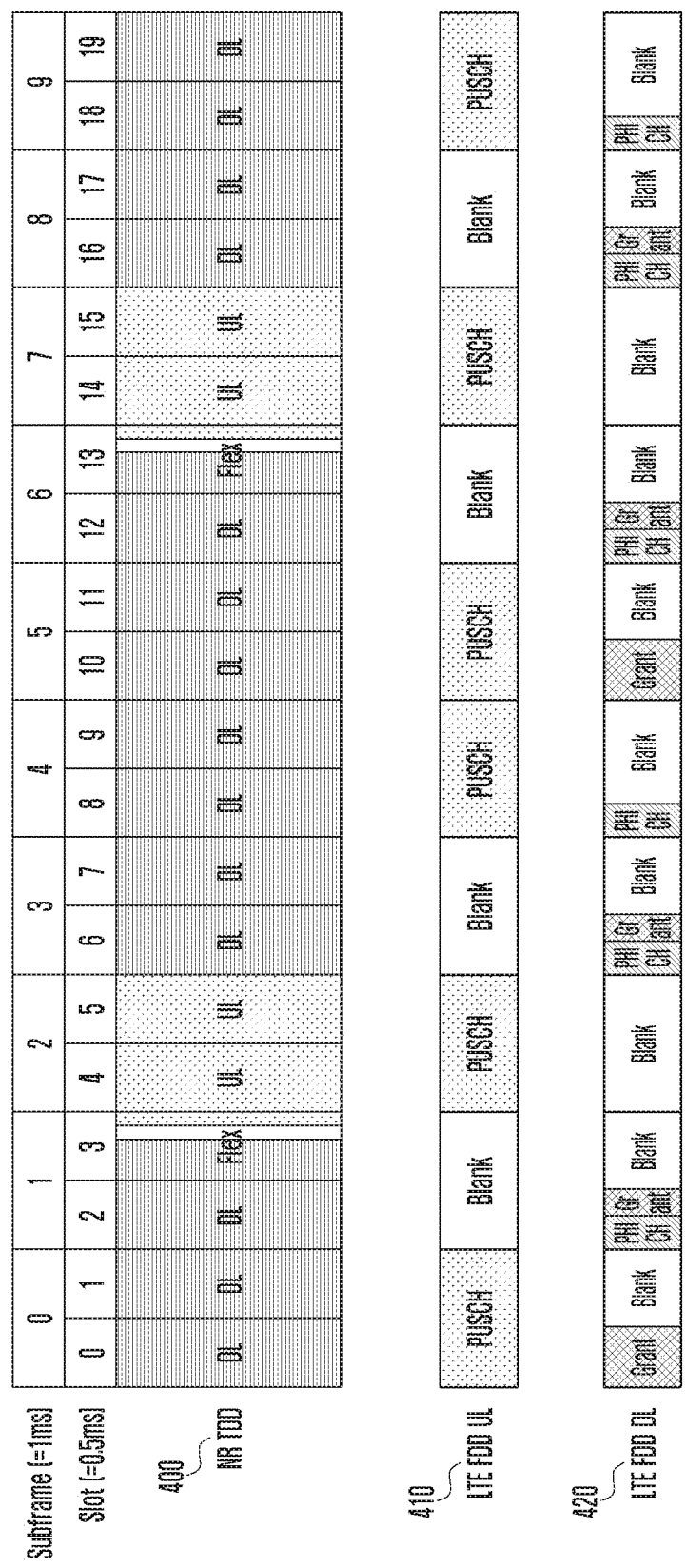
FIG. 7 is a diagram illustrating a detailed example of resource assignment based on a method of determining a resource assignment pattern while permitting IMD interference according to an embodiment of the disclosure.

FIG. 4 is a diagram illustrating a detailed example of resource assignment based on a method of determining a resource assignment pattern while permitting the occurrence of IMD interference according to an embodiment of the disclosure. FIG. 6 is a diagram illustrating a detailed example of resource assignment based on a method of determining a resource assignment pattern while permitting IMD interference according to an embodiment of the disclosure. FIG. 7 is a diagram illustrating a detailed example of resource assignment based on a method of determining a resource assignment pattern while permitting IMD interference according to an embodiment of the disclosure. FIGS. 4 to 7 illustrate an example in which a serving cell (or cell group) whose scheduling and resource assignment are unrestricted borrows an NR system and a serving cell (or cell group) whose scheduling and resource assignment are restricted borrows an LTE system, but the disclosure is not restricted by such an example.

Referring to FIG. 4, an example of resource assignment is illustrated in which the assignment of an UL transmission-related resource to all subframes is permitted. A serving cell (or cell group) whose scheduling and resource assignment are unrestricted borrows an NR system. The serving cell (or cell group) whose scheduling and resource assignment are unrestricted transmits its own resource assignment pattern-related information to a serving cell (or cell group) whose scheduling and resource assignment are restricted. The NR system may operate according to TDD. An NR TDD subframe 400 may be configured with a DL resource, an UL resource and a flexible resource (resource not predetermined whether it will be used in DL or UL). FIG. 4 illustrates an NR TDD resource assignment pattern. In this case, a serving cell (or cell group) whose scheduling and resource assignment are restricted permits the assignment of an UL grant 440 to all the subframes of an LTE DL subframe 420 and permits the assignment of a PHICH 450 to all the subframes of the LTE DL subframe 420. Furthermore, the serving cell (or cell group) whose scheduling and resource assignment are restricted permits the assignment of a PUSCH 430 to all the subframes of an LTE UL subframe 410. FIG. 4 corresponds to operations 300 to 306 in FIG. 3.

Figure 5:
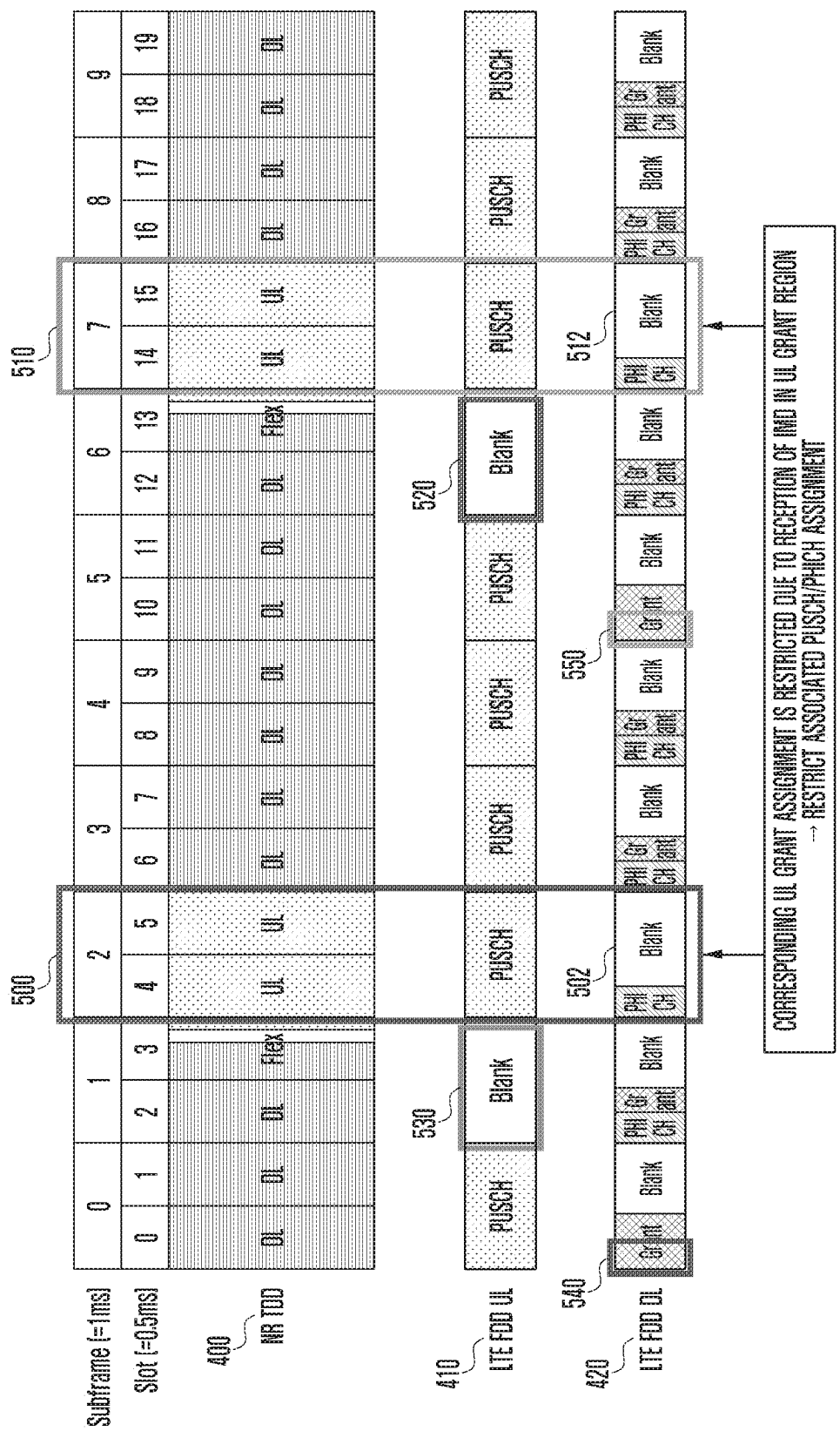
FIG. 5 is a diagram illustrating a detailed example of resource assignment based on a method of determining a resource assignment pattern while permitting IMD interference according to an embodiment of the disclosure.

Referring to FIG. 5, an example is illustrated in which the assignment of a PUSCH and PHICH corresponding to an UL grant is restricted if is received in an UL grant region. NR TDD UL transmission and LTE FDD UL transmission may overlap in subframes #2 500 and #7 510. The UL grant of the subframes #2 and #7 may be influenced by IMD interference. In this case, a serving cell (or cell group) whose scheduling and resource assignment are restricted does not assign an UL grant to the subframes #2 and #7 502 and 512 of the LTE FDD DL subframe 420. Furthermore, accordingly, the serving cell (or cell group) whose scheduling and resource assignment are restricted does not assign a PUSCH to the subframes #6 520 and #1 530 of the LTE FDD UL subframe 410 that may have corresponded if UL grants have been present in the subframes #2 and #7. Furthermore, the serving cell (or cell group) whose scheduling and resource assignment are restricted does not assign a PHICH to the subframes #0 540 and #5 550 of the LTE FDD DL subframe 420 that may have corresponded if UL grants have been present in the subframes #2 and #7. FIG. 5 may correspond to operations 308 to 322 in FIG. 3.

Referring to FIG. 6, an example is illustrated in which the assignment of an UL grant corresponding to the PHICH, a PUSCH and the PHICH is restricted if IMD interference is received in a PHICH region. NR TDD UL transmission and LTE FDD UL transmission may overlap in subframes #2 600 and #7 610. Accordingly, the PHICHs of the subframes #2 and #7 may be influenced by IMD interference. In this case, a serving cell (or cell group) whose scheduling and resource assignment are restricted does not assign a PHICH to the subframes #2 and #7 602 and 612 of the LTE FDD DL subframe 420. Furthermore, accordingly, the serving cell (or cell group) whose scheduling and resource assignment are restricted does not assign a PUSCH to the subframes #8 620 and #3 630 of the LTE FDD UL subframe 410 that may have corresponded if PHICHs have been present in the subframes #2 and #7. Furthermore, the serving cell (or cell group) whose scheduling and resource assignment are restricted does not assign an UL grant to the subframe #4 640 and #9 650 of the LTE FDD DL subframe 420 that may have corresponded if PHICHs have been present in the subframes #2 and #7. FIG. 6 may correspond to operations 324 to 338 in FIG. 3.

Referring to FIG. 7, the results of the assignment of UL transmission-related resources is illustrated. An UL transmission-related resource assignment pattern, such as FIG. 7, may be determined through the processes of FIGS. 4 to 6. Such a pattern is stored by a serving cell (or cell group) whose scheduling and resource assignment are restricted.

Figure 8:
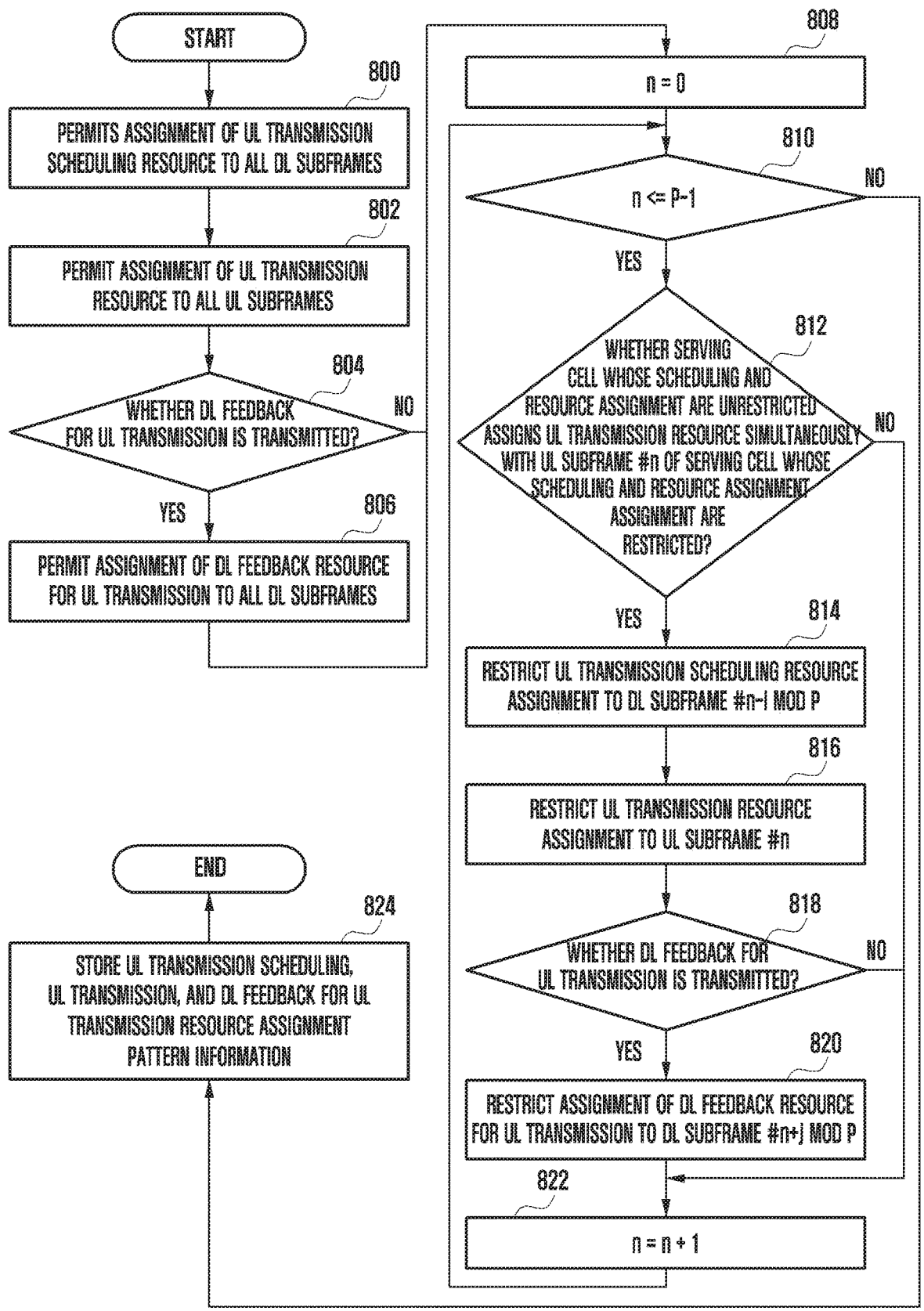
FIG. 8 is a diagram describing a detailed operation of a method of determining an UL transmission-related resource assignment pattern while not permitting IMD interference according to an embodiment of the disclosure.

FIG. 8 is a diagram describing a detailed operation of a method of determining an UL transmission-related resource assignment pattern while not permitting IMD interference according to an embodiment of the disclosure.

Referring to FIG. 8, illustrated is a method of time multiplexing the UL transmission of different cells or cell groups so that IMD interference does not occur in a DL subframe due to the overlapped UL transmission of different cells or cell groups.

A serving cell (or cell group) whose scheduling and resource assignment are restricted permits the assignment of an UL transmission scheduling resource to all DL subframes (or slots) at operation 800, and permits the assignment of an UL transmission resource to all UL subframes (or slots) at operation 802. Next, the serving cell (or cell group) whose scheduling and resource assignment are restricted determines whether DL feedback for UL transmission is transmitted at operation 804. In such a case, the serving cell (or cell group) permits the assignment of a DL feedback resource for UL transmission to all the DL subframes (or slots) at operation 806. If DL feedback for UL transmission is not transmitted, the serving cell (or cell group) performs operation 808 without a separate operation.

The serving cell (or cell group) whose scheduling and resource assignment are restricted divides all the resources in a resource assignment pattern unit having P subframes (or slots) as a cycle, and performs UL transmission scheduling resource assignment and UL transmission resource assignment and DL feedback resource assignment restriction operations for UL transmission.

The serving cell (or cell group) whose scheduling and resource assignment are restricted determines whether a serving cell (or cell group) whose scheduling and resource assignment are unrestricted assigns an UL transmission resource at the same timing as the n-th UL subframe (or slot) of the serving cell (or cell group) whose scheduling and resource assignment are restricted, while increasing n from 0 to P−1 by 1 in order to determine an UL transmission scheduling resource assignment and UL transmission resource assignment and DL feedback (for UL transmission) resource assignment pattern having P subframes (or slots) as a cycle.

Specifically, the serving cell (or cell group) whose scheduling and resource assignment are restricted sets n to 0 at operation 808, and then checks whether n is smaller than or equal to P−1 at operation 810. If n is smaller than or equal to P−1, the serving cell (or cell group) determines whether a serving cell (or cell group) whose scheduling and resource assignment are unrestricted assigns (or can assign) an UL transmission resource in an n-th DL subframe (or slot) at operation 812. If the serving cell (or cell group) whose scheduling and resource assignment are unrestricted does not assign an UL transmission resource, the serving cell (or cell group) whose scheduling and resource assignment are restricted terminates the investigation into the n-th subframe (or slot) and performs an investigation into a next (n+1)-th subframe (or slot). If the next (n+1)-th subframe is a P-th subframe, the serving cell (or cell group) performs operation 824 without an additional operation.

If, as a result of the investigation, the serving cell (or cell group) whose scheduling and resource assignment are unrestricted assigns an UL transmission resource, the serving cell (or cell group) whose scheduling and resource assignment are restricted restricts the assignment of an UL transmission scheduling resource to an (n−i) mod P-th DL subframe (or slot) at operation 814, restricts the assignment of an UL transmission resource to the n-th UL subframe at operation 816, and determines whether the serving cell (or cell group) whose scheduling and resource assignment are restricted transmits DL feedback for UL transmission at operation 818. In this case, if the serving cell (or cell group) whose scheduling and resource assignment are restricted transmits DL feedback for UL transmission, the serving cell (or cell group) whose scheduling and resource assignment are restricted restricts the assignment of a DL feedback resource for UL transmission to an (n+j) mod P-th DL subframe at operation 820. Accordingly, the serving cell (or cell group) whose scheduling and resource assignment are restricted terminates the investigation into the n-th subframe, and performs an investigation into a next (n+1)-th subframe. If the next (n+1)-th subframe is a P-th subframe, the serving cell (or cell group) performs operation 824 without an additional operation.

If the serving cell (or cell group) whose scheduling and resource assignment are restricted does not transmit DL feedback for UL transmission, the serving cell (or cell group) whose scheduling and resource assignment are restricted terminates the investigation into the n-th subframe and performs the investigation into the next (n+1)-th subframe at operation 822. If the next (n+1)-th subframe is a P-th subframe, the serving cell (or cell group) whose scheduling and resource assignment are restricted performs operation 824 without an additional operation.

At operation 824, the serving cell (or cell group) whose scheduling and resource assignment are restricted stores UL transmission scheduling resource, UL transmission resource, and DL feedback (for UL transmission) resource assignment pattern information determined depending on whether IMD interference occurs in an UL transmission resource assignment region. Accordingly, the process of determining the UL transmission scheduling resource, UL transmission resource, and DL feedback (for UL transmission) resource assignment pattern is terminated. In this case, the resource assignment pattern is defined for contiguous P subframes (or slots) as described above.

The operations illustrated in FIG. 8 do not need to be sequentially performed in the sequence illustrate din FIG. 8. The order of the operations may be changed or the operations may be omitted, and such a change or omission may be construed as being included in the scope of the disclosure if there is an effect intended by the disclosure by the change or omission.

FIGS. 9 to 12 are diagrams illustrating a detailed example of resource assignment based on a method of determining a resource assignment pattern while not permitting the occurrence of IMD interference according to various embodiments of the disclosure. FIGS. 9 to 12 illustrate examples in which a serving cell (or cell group) whose scheduling and resource assignment are unrestricted borrows an NR system and a serving cell (or cell group) whose scheduling and resource assignment are restricted borrows an LTE system, but the disclosure is not restricted by such an example.

Figure 9:
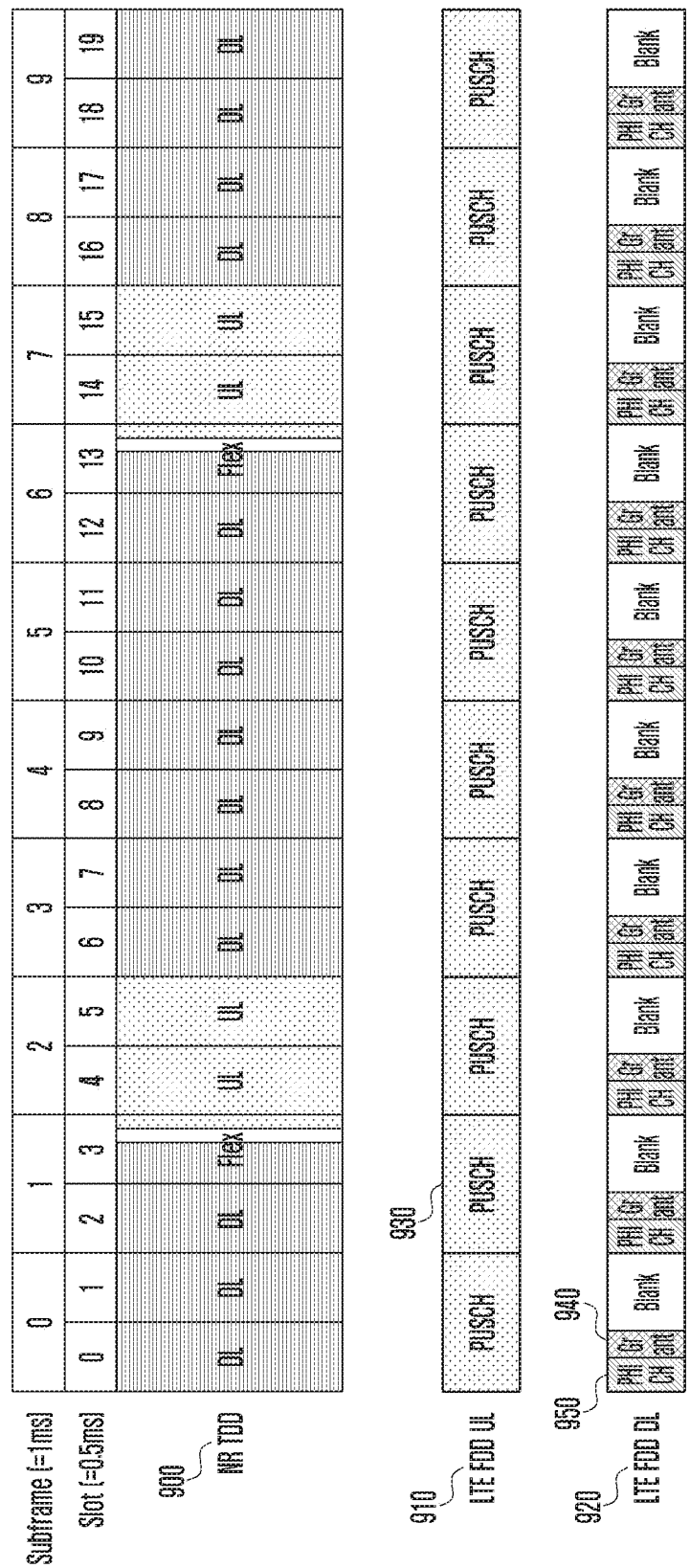
FIG. 9 is a diagram illustrating a detailed example of resource assignment based on a method of determining a resource assignment pattern while not permitting the occurrence of IMD interference according to an embodiment of the disclosure.

Referring to FIG. 9, FIG. 9 is a diagram illustrating an example of resource assignment in which the assignment of an UL transmission-related resource to all subframes has been permitted. A serving cell (or cell group) whose scheduling and resource assignment are unrestricted borrows an NR system. The serving cell (or cell group) whose scheduling and resource assignment are unrestricted transmits its own resource assignment pattern-related information to a serving cell (or cell group) whose scheduling and resource assignment are restricted. The NR system may operate according to TDD, and a resource assignment pattern may be the same as the NR TDD subframe 900. In this case, the serving cell (or cell group) whose scheduling and resource assignment are restricted permits the assignment of an UL grant 940 to all the subframes of an LTE DL subframe 920 and permits the assignment of a PHICH 950 to all the subframes of the LTE DL subframe 920. Furthermore, the serving cell (or cell group) whose scheduling and resource assignment are restricted permits the assignment of a PUSCH 930 to all the subframes of an LTE UL subframe 910. FIG. 9 corresponds to operations 800 to 806 in FIG. 8.

Figure 10:
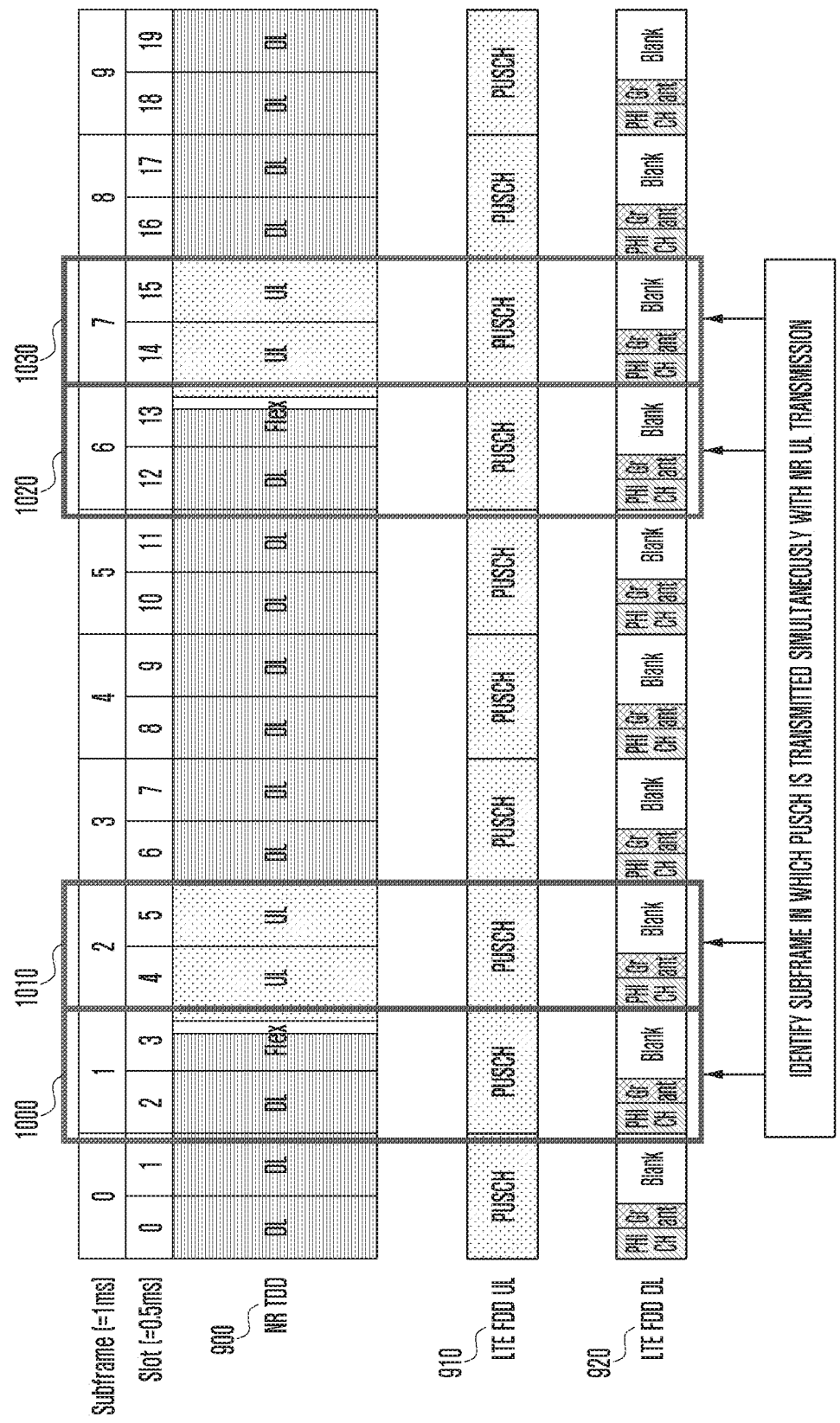
FIG. 10 is a diagram illustrating a detailed example of resource assignment based on a method of determining a resource assignment pattern while not permitting the occurrence of IMD interference according to an embodiment of the disclosure.

Referring to FIG. 10, FIG. 10 is a diagram illustrating an example in which a PUSCH resource assigned simultaneously with an NR UL transmission resource is determined. In this case, the NR UL transmission resource also includes a flexibly configured resource having a possibility that UL transmission will be performed in addition to an UL resource. In the case of subframes #1 1000, #2 1010, #6 1020 and #7 1030, IMD interference may occur if a PUSCH resource is assigned to the LTE FDD UL subframe 910. Accordingly, a serving cell (or cell group) whose scheduling and resource assignment are restricted may not assign a PUSCH resource to the subframes #1 1000, #2 1010, #6 1020 and #7 1030. FIG. 10 may correspond to operation 812 in FIG. 8.

Figure 11:
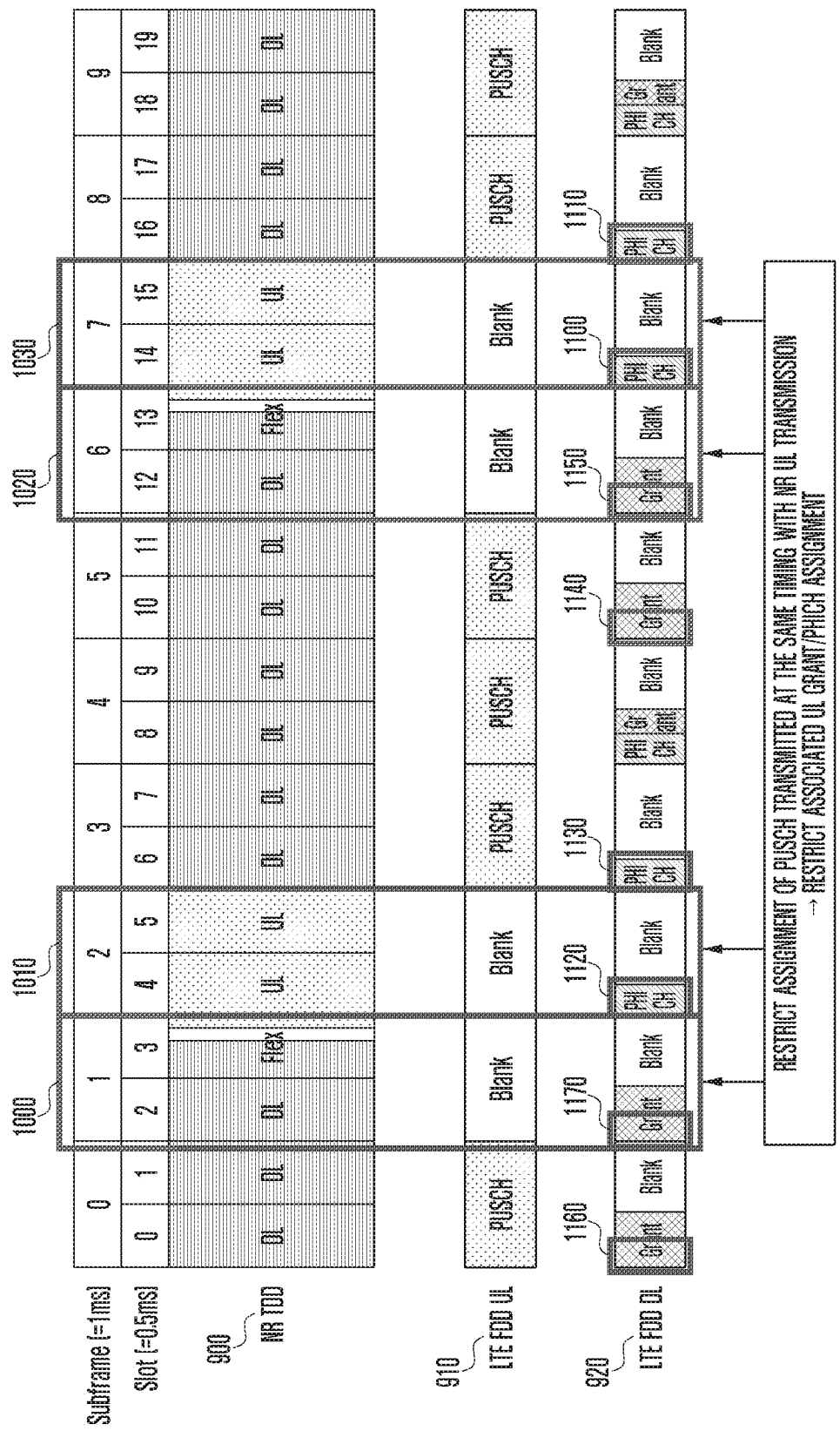
FIG. 11 is a diagram illustrating a detailed example of resource assignment based on a method of determining a resource assignment pattern while not permitting the occurrence of IMD interference according to an embodiment of the disclosure.

Referring to FIG. 11, FIG. 11 is a diagram illustrating a PUSCH assigned simultaneously with an NR UL transmission resource, an UL grant corresponding to the PUSCH, a PHICH and an example in which the assignment of the PUSCH is restricted. A serving cell (or cell group) whose scheduling and resource assignment are restricted determines an UL grant and PHICH resource that may have corresponded if a PUSCH resource has been assigned to subframes #1 1000, #2 1010, #6 1020 and #7 1030, and restricts resource assignment. Specifically, the serving cell (or cell group) whose scheduling and resource assignment are restricted does not assign an UL grant to the subframes #7 1100, #8 1110, #2 1120 and #3 1130 (corresponding to an n−4 subframe if PUSCH transmission has been performed in a subframe n) of the LTE FDD DL subframe 920. Furthermore, the serving cell (or cell group) whose scheduling and resource assignment are restricted does not assign an UL grant to the subframes #5 1140, #6 1150, #0 1160 and #1 1170 (corresponding to an n+4 subframe if PUSCH transmission has been performed in the subframe n) of the LTE FDD DL subframes 920.

Figure 12:
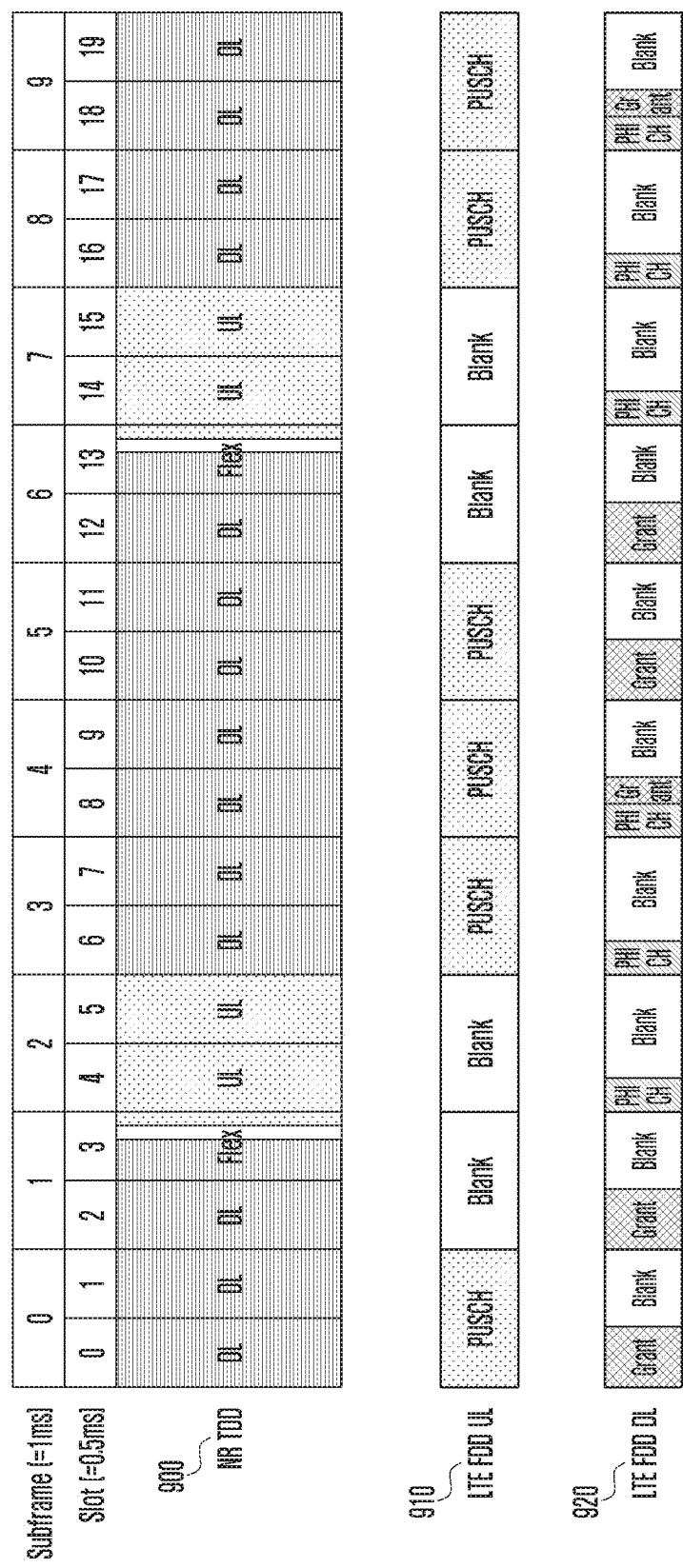
FIG. 12 is a diagram illustrating a detailed example of resource assignment based on a method of determining a resource assignment pattern while not permitting the occurrence of IMD interference according to an embodiment of the disclosure.

Referring to FIG. 12, FIG. 12 is a diagram illustrating the results of the assignment of UL transmission-related resources. An UL transmission-related resource assignment pattern, such as FIG. 12, may be determined through the process of FIGS. 9 to 11. Such a pattern is stored by a serving cell (or cell group) whose scheduling and resource assignment are restricted.

Figure 13A:
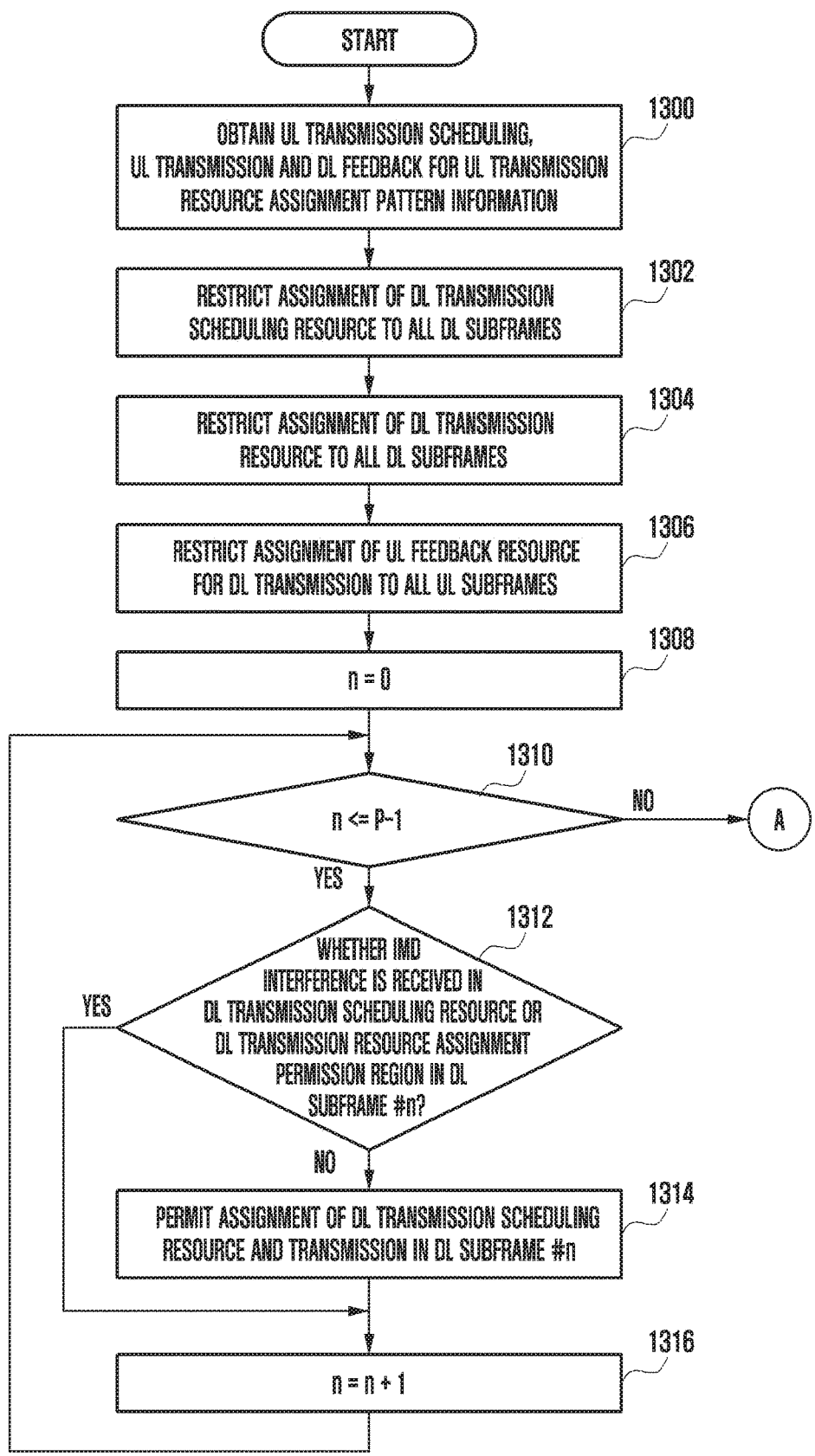
FIG. 13A is a diagram describing a detailed operation based on a method for a serving cell (or cell group) whose scheduling and resource assignment are restricted to determine a downlink (DL) transmission-related resource assignment pattern according to an embodiment of the disclosure.
Figure 13C:
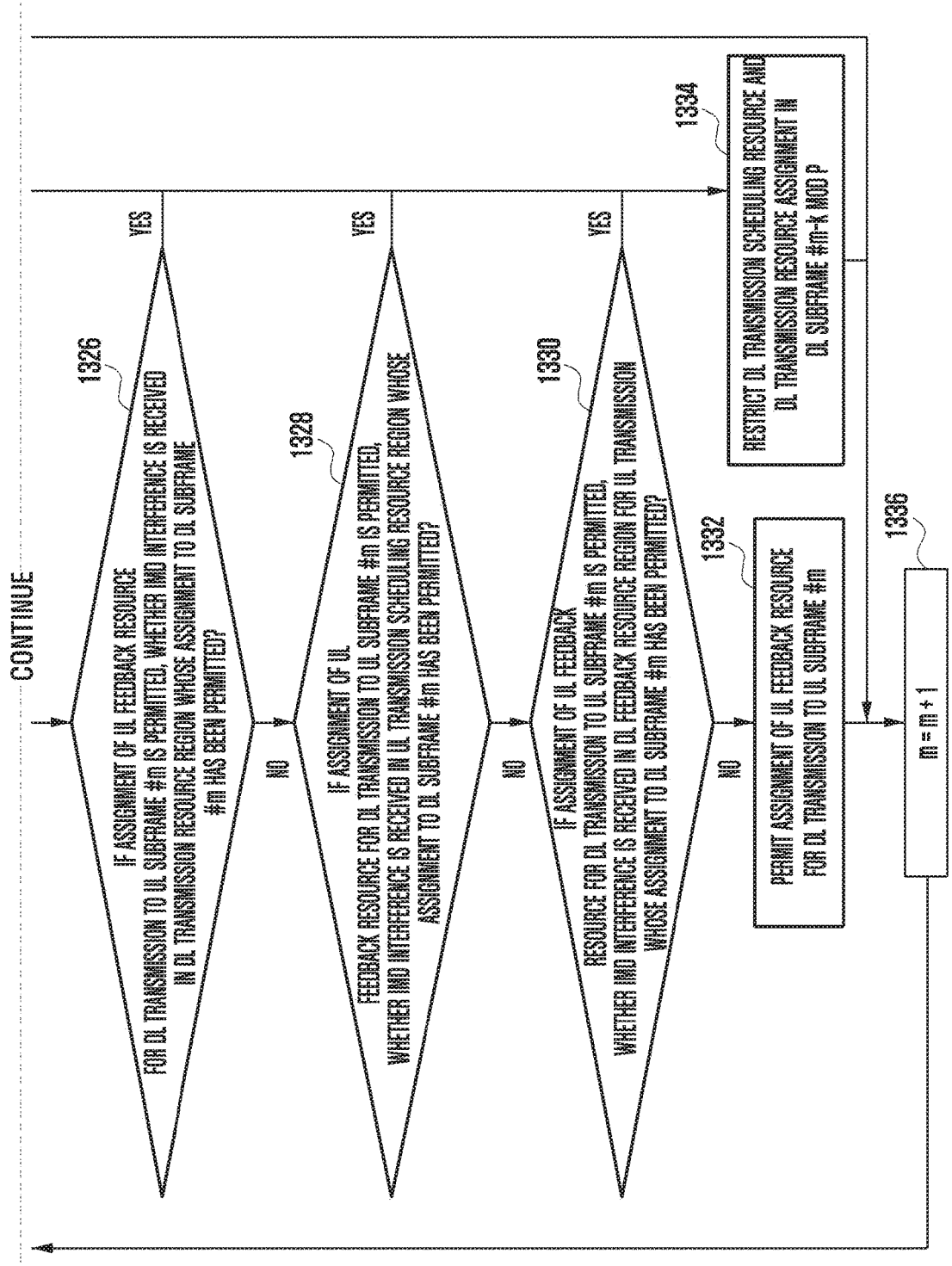
FIG. 13C is a diagram describing a detailed operation based on a method for a serving cell (or cell group) whose scheduling and resource assignment are restricted to determine a DL transmission-related resource assignment pattern according to an embodiment of the disclosure.

FIGS. 13A to 13C are diagrams describing a detailed operation of a method of determining, by a serving cell (or cell group) whose scheduling and resource assignment are restricted, a DL transmission-related resource assignment pattern according to various embodiments of the disclosure.

Referring to FIGS. 13A to 13C, FIG. 13A to 13C are configured with a process for a serving cell (or cell group) whose scheduling and resource assignment are restricted to first not permit DL transmission-related resource assignment to DL and UL subframes, second assign a DL transmission scheduling resource and DL transmission resource to a DL subframe in which IMD interference is not received through a DL transmission scheduling resource or DL transmission resource, third assign a corresponding UL feedback resource for DL transmission when IMD interference occurs in a DL channel and signal pre-assigned by the UL feedback resource for DL transmission if a DL transmission scheduling resource and a DL transmission resource are assigned and not assign a DL transmission scheduling resource and DL transmission resource if not.

The serving cell (or cell group) whose scheduling and resource assignment are restricted obtains the determined UL transmission scheduling, UL transmission and DL feedback (for UL transmission) resource assignment pattern information at operation 1300. Furthermore, the serving cell (or cell group) whose scheduling and resource assignment are restricted restricts the assignment of a DL transmission scheduling resource to all DL subframes (or slots) at operation 1302, restricts the assignment of a DL transmission resource to all the DL subframes (or slots) at operation 1304, and restricts the assignment of an UL feedback resource for DL transmission to all UL subframes (or slots) at operation 1306.

At a next operation, the serving cell (or cell group) whose scheduling and resource assignment are restricted divides all the resources in a resource assignment pattern unit having P subframes (or slots) as a cycle, and performs DL transmission scheduling resource and DL transmission resource assignment permission operations.

The serving cell (or cell group) whose scheduling and resource assignment are restricted investigates whether IMD interference may be received in the region if the assignment of a DL transmission scheduling resource or DL transmission resource is permitted in an n-th DL subframe (or slot), while increasing n from 0 to P−1 by 1, in order to determine a DL transmission scheduling resource and DL transmission resource assignment pattern having the P subframes (or slots) as a cycle. Specifically, the serving cell (or cell group) whose scheduling and resource assignment are restricted sets n to 0 at operation 1308, and then checks whether n is smaller than or equal to P−1 at operation 1310. If n is smaller than or equal to P−1, the serving cell (or cell group) investigates whether IMD interference may be received in the assignment region if a DL transmission scheduling resource or a DL transmission resource has been assigned has been assigned in the n-th DL subframe (or slot) at operation 1312.

If IMD interference may be received as a result of the investigation into the reception of IMD interference in the DL transmission scheduling resource or DL transmission resource assignment region of the n-th DL subframe (or slot), the serving cell (or cell group) whose scheduling and resource assignment are restricted terminates the investigation into the n-th subframe (without assigning a DL transmission scheduling resource and a DL transmission resource), and performs an investigation into a next (n+1)-th subframe. If the next (n+1)-th subframe is a P-th subframe, the serving cell (or cell group) whose scheduling and resource assignment are restricted performs operation 1318 without an additional operation. However, if IMD interference cannot be received as a result of the investigation into the reception of IMD interference in the DL transmission scheduling resource or DL transmission resource assignment region of the n-th DL subframe (or slot), the serving cell (or cell group) whose scheduling and resource assignment are restricted permits the assignment of the DL transmission scheduling resource and DL transmission resource in the n-th DL subframe (or slot) at operation 1314. Thereafter, the serving cell (or cell group) whose scheduling and resource assignment are restricted performs an investigation into a next (n+1)-th DL subframe. If the next (n+1)-th subframe is a P-th subframe, the serving cell (or cell group) performs operation 1318 without an additional operation.

Thereafter, the serving cell (or cell group) whose scheduling and resource assignment are restricted divides all the resources in a resource assignment pattern unit having P subframes (or slots) as a cycle, and performs a DL transmission scheduling resource and DL transmission resource assignment restriction and UL feedback resource assignment permission operation for DL transmission.

The serving cell (or cell group) whose scheduling and resource assignment are restricted determines whether the assignment of a DL transmission scheduling resource and DL transmission resource is permitted in an (m−k) mod P-th DL subframe (or slot), while increasing m from 0 to P−1 by 1, in order to determine a DL transmission scheduling resource and DL transmission resource and UL feedback (for DL transmission) resource assignment pattern having the P subframes (or slots) as a cycle. Specifically, the serving cell (or cell group) whose scheduling and resource assignment are restricted sets m to 0 at operation 1318 and then checks whether m is smaller than or equal to P−1 at operation 1320. If m is smaller than or equal to P−1, the serving cell (or cell group) determines whether the assignment of a DL transmission scheduling resource and DL transmission resource has been permitted in the (m−k)-th DL subframe (or slot) at operation 1322.

If the assignment of a DL transmission scheduling resource and DL transmission resource has not been permitted in the (m−k)-th DL subframe (or slot), the serving cell (or cell group) whose scheduling and resource assignment are restricted terminates the investigation into the m-th subframe and performs an investigation into a next (m+1)-th subframe. If the next (m+1)-th subframe is a P-th subframe at operation 1320, the serving cell (or cell group) whose scheduling and resource assignment are restricted performs operation 1338 without an additional operation. However, if the assignment of a DL transmission scheduling resource and DL transmission resource has not been permitted in an (m−k) mod P-th DL subframe (or slot), the serving cell (or cell group) whose scheduling and resource assignment are restricted investigates whether IMD interference may be received in the DL transmission scheduling resource region to which assignment has been permitted in the m-th DL subframe (or slot) if the assignment of an UL feedback resource for DL transmission (of the (m−k)-th subframe) to the m-th UL subframe (or slot) is permitted at operation 1324. That is, this is to identify whether IMD interference is received in the DL transmission scheduling resource region to which assignment has been permitted because the UL transmissions of different cells or cell groups overlap due to the assignment of the UL feedback resource for DL transmission in the m-th subframe.

If IMD interference may be received as a result of the investigation into the reception of IMD interference in the DL transmission scheduling resource assignment permission region to which assignment has been permitted in the m-th DL subframe (or slot) at operation 1324, the serving cell (or cell group) whose scheduling and resource assignment are restricted restricts the assignment of the DL transmission scheduling resource and DL transmission resource previously permitted in the (m−k) mod P-th DL subframe (or slot) at operation 1334 and terminates the investigation into the m-th subframe. Thereafter, the serving cell (or cell group) whose scheduling and resource assignment are restricted performs investigation into a next (m+1)-th subframe. If the next (m+1)-th subframe is a P-th subframe, the serving cell (or cell group) performs operation 1338 without an additional operation. However, if IMD interference is not received as a result of the investigation into the reception of IMD interference in the DL transmission scheduling resource region to which assignment has been permitted in the m-th DL subframe (or slot), the serving cell (or cell group) whose scheduling and resource assignment are restricted investigates whether IMD interference may be received in the DL transmission resource region whose assignment to the m-th DL subframe (or slot) has been permitted if the assignment of an UL feedback resource for DL transmission to the m-th UL subframe (or slot) is permitted at operation 1326. That is, this is to identify whether IMD interference is received in the DL transmission resource region to which assignment has been permitted because the UL transmissions of different cells or cell groups overlap due the assignment of the UL feedback resource for DL transmission to the m-th subframe.

If IMD interference may be received as a result of the investigation into the reception of IMD interference in the DL transmission resource region to which assignment has been permitted in the m-th DL subframe (or slot), the serving cell (or cell group) whose scheduling and resource assignment are restricted restricts the assignment of the DL transmission scheduling resource and DL transmission resource previously permitted in the (m−k) mod P-th DL subframe (or slot) at operation 1334 and terminates the investigation into the m-th subframe. Thereafter, the serving cell (or cell group) whose scheduling and resource assignment are restricted performs investigation into a next (m+1)-th subframe. If the next (m+1)-th subframe is a P-th subframe, the serving cell (or cell group) performs operation 1338 without an additional operation. However, if IMD interference is not received as a result of the investigation into the reception of IMD interference in the DL transmission resource region to which assignment has been permitted in the m-th DL subframe (or slot), the serving cell (or cell group) whose scheduling and resource assignment are restricted investigates whether IMD interference may be received in an UL transmission scheduling resource region to which assignment has been permitted in the m-th DL subframe (or slot) if the assignment of an UL feedback resource for DL transmission to the m-th UL subframe (or slot) is permitted at operation 1328. That is, this is to identify whether IMD interference is received in the UL transmission scheduling resource region to which assignment has been permitted because the UL transmissions of different cells or cell groups overlap due the assignment of the UL feedback resource for DL transmission to the m-th subframe.

If IMD interference may be received as a result of the investigation into the reception of IMD interference in the UL transmission scheduling resource assignment permission region to which assignment has been permitted in the m-th DL subframe (or slot), the serving cell (or cell group) whose scheduling and resource assignment are restricted restricts the assignment of a DL transmission scheduling resource and DL transmission resource previously permitted in the (m−k) mod P-th DL subframe (or slot) at operation 1334. As described above, the serving cell (or cell group) whose scheduling and resource assignment are restricted terminates the investigation into the m-th subframe and performs investigation into a next (m+1)-th subframe. If the next (m+1)-th subframe is a P-th subframe, the serving cell (or cell group) performs 1338 without an additional operation. However, if IMD interference is not received as a result of the investigation into the reception of IMD interference in the UL transmission scheduling resource assignment permission region to which assignment has been permitted in the m-th DL subframe (or slot), the serving cell (or cell group) whose scheduling and resource assignment are restricted investigates whether IMD interference may be received in a DL feedback resource region for UL transmission to which assignment has been permitted in the m-th DL subframe (or slot) if the assignment of a DL feedback resource for UL transmission to the m-th UL subframe (or slot) is permitted at operation 1330. That is, this is to identify whether IMD interference is received in the DL feedback resource region for UL transmission to which assignment has been permitted because the UL transmissions of different cells or cell groups overlap due the assignment of the UL feedback resource for DL transmission to the m-th subframe.

If IMD interference may be received as a result of the investigation into the reception of IMD interference in the DL feedback resource region for UL transmission to which assignment has been permitted in the m-th DL subframe (or slot), the serving cell (or cell group) whose scheduling and resource assignment are restricted restricts the assignment of the DL transmission scheduling resource and DL transmission resource previously permitted in the (m−k) mod P-th DL subframe (or slot) at operation 1334 and terminates the investigation into the m-th subframe. The serving cell (or cell group) whose scheduling and resource assignment are restricted performs investigation into a next (m+1)-th subframe. If the next (m+1)-th subframe is a P-th subframe, the serving cell (or cell group) performs operation 1338 without an additional operation. However, if IMD interference is not received as a result of the investigation into the reception of IMD interference in the DL feedback resource assignment permission region for UL transmission to which assignment has been permitted in the m-th DL subframe (or slot), the serving cell (or cell group) whose scheduling and resource assignment are restricted permits the assignment of the UL feedback resource for DL transmission to the m-th UL subframe (or slot) at operation 1332 and performs investigation into a next (m+1)-th subframe. At operation 1336, m is incremented by 1 and the process returns to operation 1320. At operation 1320, if the next (m+1)-th subframe is a P-th subframe, the serving cell (or cell group) performs operation 1338 without an additional operation.

In the embodiments of the disclosure, if a DL transmission resource is assigned to a DL subframe m, an index k indicative of a subframe difference taken for an UL feedback transmission resource to be assigned to an UL subframe m+k may mean 4 in LTE. In this case, a time difference for the 4-subframe difference may mean 4 ms. Such k is a value which may be randomly set by a base station within the range defined in the 3GPP standard in an NR system. A serving cell (or cell group) whose scheduling and resource assignment are restricted may determine a DL transmission-related resource by considering such a k value in the same manner.

Thereafter, at operation 1338, the serving cell (or cell group) whose scheduling and resource assignment are restricted stores DL transmission scheduling resource, DL transmission resource, and UL feedback (for DL transmission) resource assignment pattern information, determined depending on whether IMD interference is received in the DL transmission scheduling resource or the DL transmission resource assignment region and whether IMD interference is received in the DL transmission scheduling resource assignment region, DL transmission resource assignment region, UL transmission scheduling resource region and DL feedback resource assignment region for UL transmission for the permission of the assignment of the UL feedback resource for DL transmission. Accordingly, the process of investigating the DL transmission scheduling resource, DL transmission resource, and UL feedback (for DL transmission) resource assignment pattern is terminated. In this case, the resource assignment pattern information is defined for contiguous P subframes (or slots) as described above.

The steps illustrated in FIG. 13 do not need to be sequentially performed in the sequence illustrate din FIG. 13. The order of the operations may be changed or the operations may be omitted, and such a change or omission may be construed as being included in the scope of the disclosure if there is an effect intended by the disclosure by the change or omission.

FIGS. 14 to 18 are diagrams illustrating a detailed example of resource assignment based on a method of determining a DL transmission-related resource assignment pattern according to various embodiments of the disclosure. FIGS. 14 to 18 illustrate an example in which a serving cell (or cell group) whose scheduling and resource assignment are unrestricted borrows an NR system and a serving cell (or cell group) whose scheduling and resource assignment are restricted borrows an LTE system, but the disclosure is not restricted by such an example.

Figure 14:
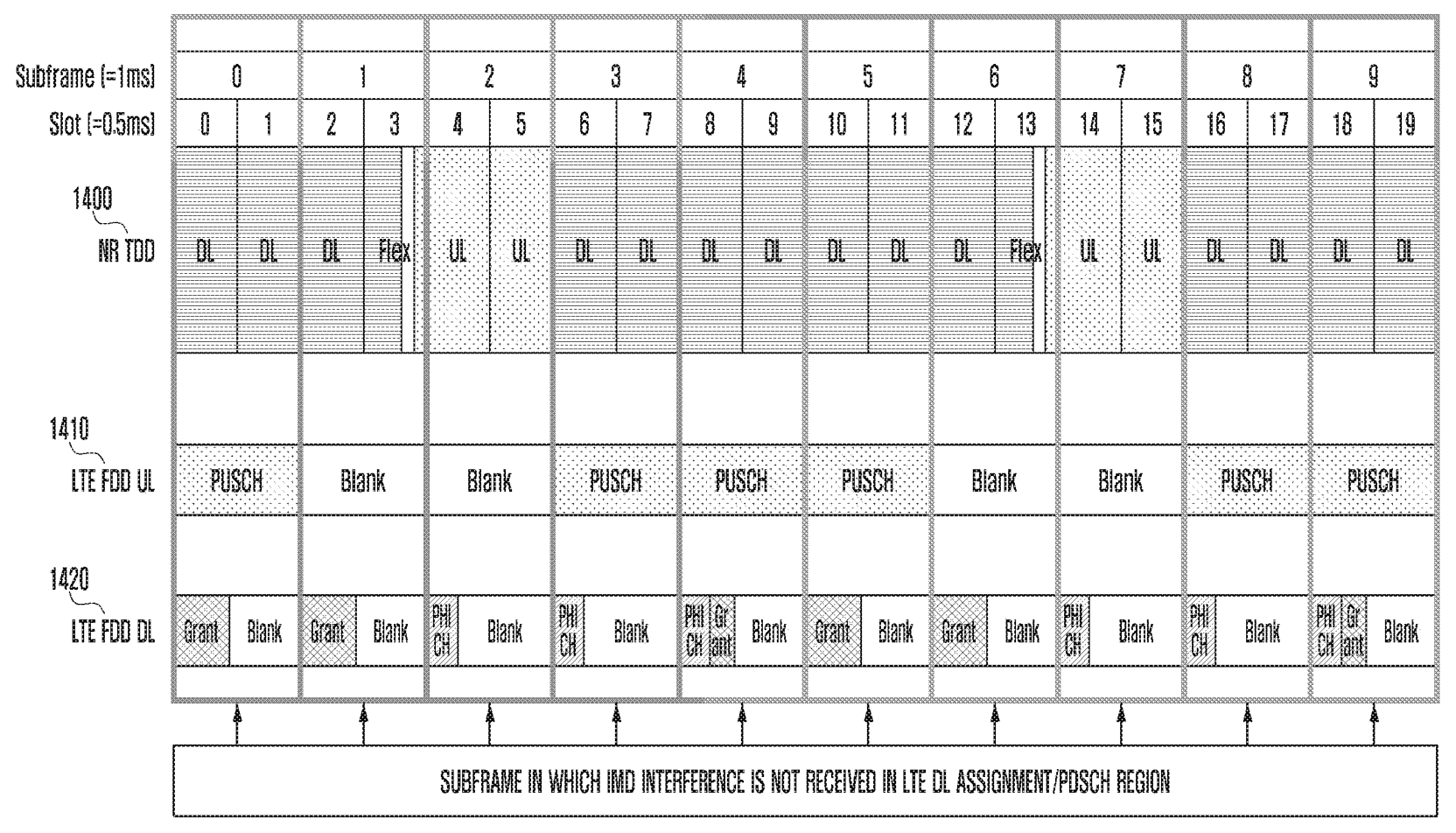

Referring to FIG. 14, FIG. 14 is a diagram illustrating an example of determining a DL subframe in which IMD interference is not received. A serving cell (or cell group) whose scheduling and resource assignment are unrestricted borrows an NR system. The serving cell (or cell group) whose scheduling and resource assignment are unrestricted transmits its own resource assignment pattern-related information to a serving cell (or cell group) whose scheduling and resource assignment are restricted. The NR system may operate according to TDD. The resource assignment pattern may be the same as the NR TDD subframe 1400. In this case, the resource assignment pattern of the UL transmission-related resource determined by the method of FIG. 8 is the same as FIG. 12. FIGS. 14 to 18 illustrate a method of determining a resource assignment pattern a DL transmission-related resource based on FIG. 12.

In the case of an LTE FDD DL subframe 1420, IMD interference is not received in all the subframes (the reason for this is that NR TDD UL transmission and LTE FDD UL transmission do not overlap on a time domain). Accordingly, a serving cell (or cell group) whose scheduling and resource assignment are restricted may identify that all the subframes of the LTE FDD DL subframe 1420 are subframes in which IMD interference is not received. FIG. 14 may correspond to operation 1312 of FIG. 13.

Figure 15:
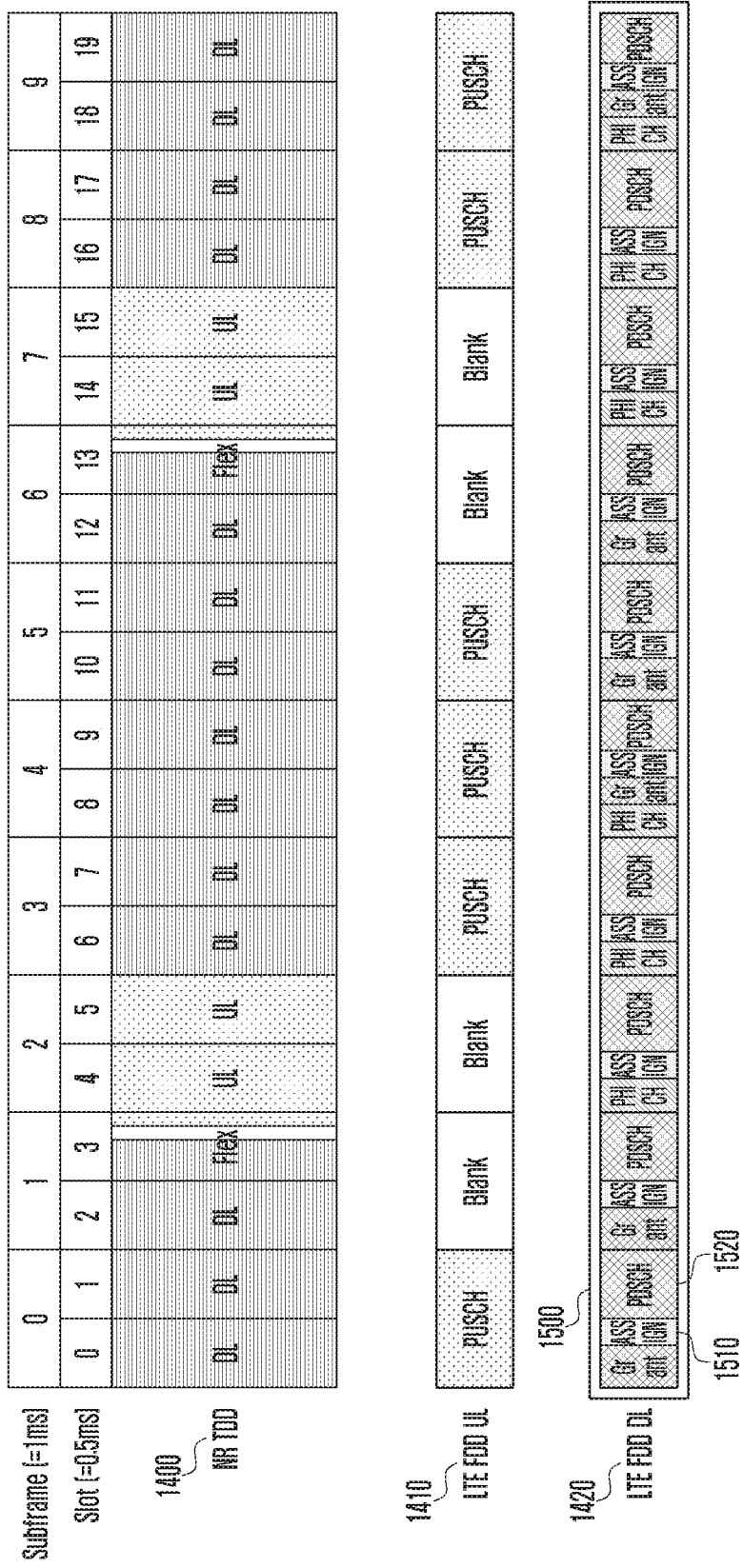
FIG. 15 is a diagram illustrating a detailed example of resource assignment based on a method of determining a DL transmission-related resource assignment pattern according to an embodiment of the disclosure.

Referring to FIG. 15, FIG. 15 is a diagram illustrating an example of DL assignment to a DL subframe in which IMD interference is not received and of assigning a PDSCH to the DL subframe. In FIG. 14, the serving cell (or cell group) whose scheduling and resource assignment are restricted has identified that IMD interference is not received in all the subframes of the LTE FDD DL subframe 1420, and thus may assign DL assignment 1510 and a PDSCH 1520 to all the subframes 1500 of the LTE FDD DL subframe 1420. FIG. 15 may correspond to operation 1314 in FIG. 13.

Figure 16:
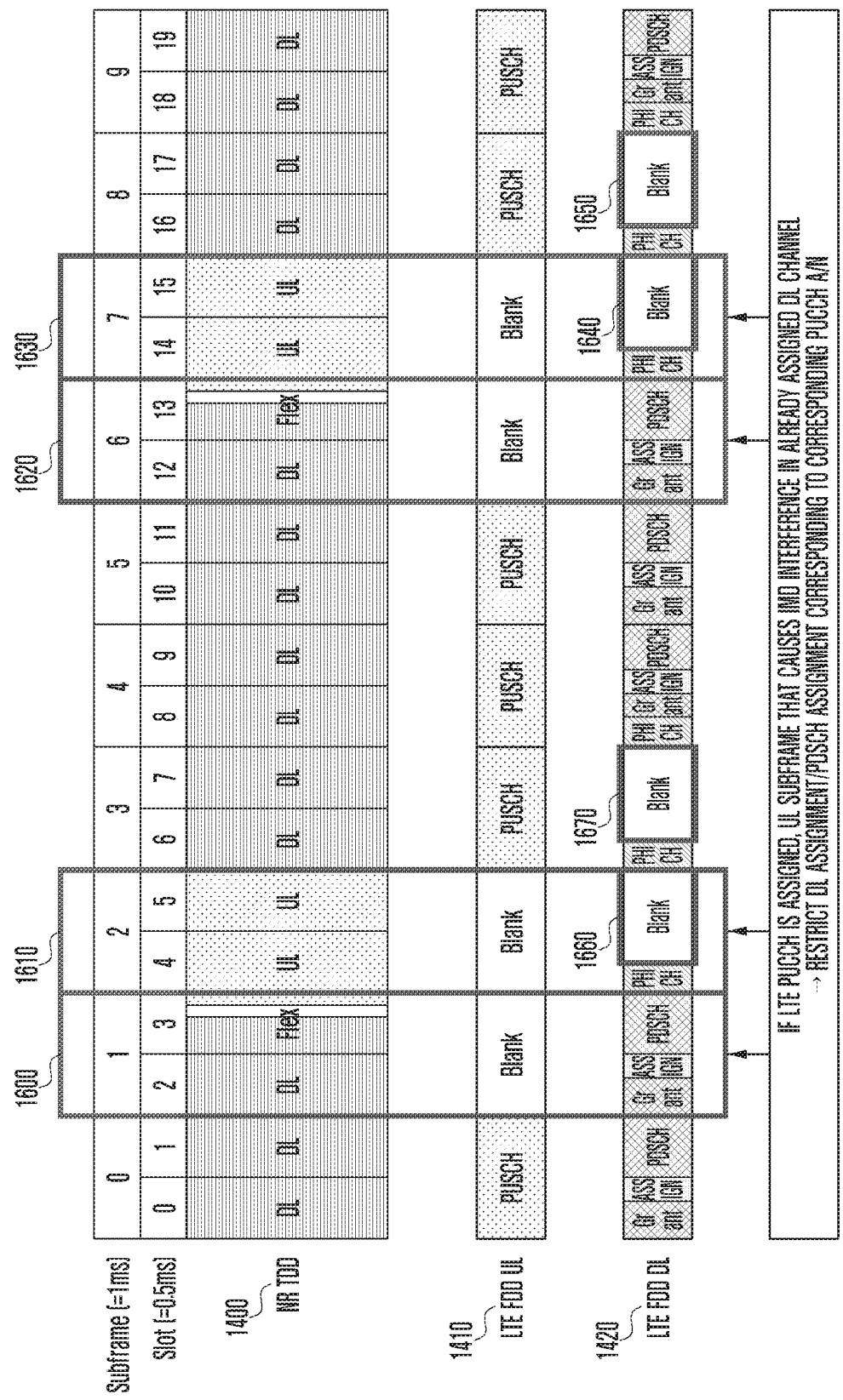
FIG. 16 is a diagram illustrating a detailed example of resource assignment based on a method of determining a DL transmission-related resource assignment pattern according to an embodiment of the disclosure.

Referring to FIG. 16, FIG. 16 is a diagram illustrating an example of corresponding DL assignment in the case of a PDSCH that causes IMD interference in a pre-assigned DL channel when a PUCCH corresponding to an assigned PDSCH is assigned, and an example in which the PDSCH assignment is restricted. If a PUCCH including feedback for DL data is assigned to the subframes #1 1600, #2 1610, #6 1620 and #7 1630 of an LTE FDD UL subframe 1410, IMD interference occurs in the LTE FDD DL subframe 1420 because such PUCCH transmission overlaps NR TDD UL transmission. In order to prevent such IMD interference, a serving cell (or cell group) whose scheduling and resource assignment are restricted restricts the DL assignment of subframes #7 1640, #8 1650, #2 1660 and #3 1670 by which corresponding PUCCHs are transmitted in the subframes #1 1600, #2 1610, #6 1620 and #7 1630 and PDSCH assignment. That is, the serving cell (or cell group) whose scheduling and resource assignment are restricted restricts such DL assignment and PDSCH assignment in order to prevent the occurrence of a PUCCH that causes IMD interference to occur in a pre-assigned UL grant, DL assignment, a PDSCH and a PHICH (this may be called a pre-assigned DL channel). FIG. 16 may correspond to operations 1324 to 1330 in FIG. 13.

Figure 17:
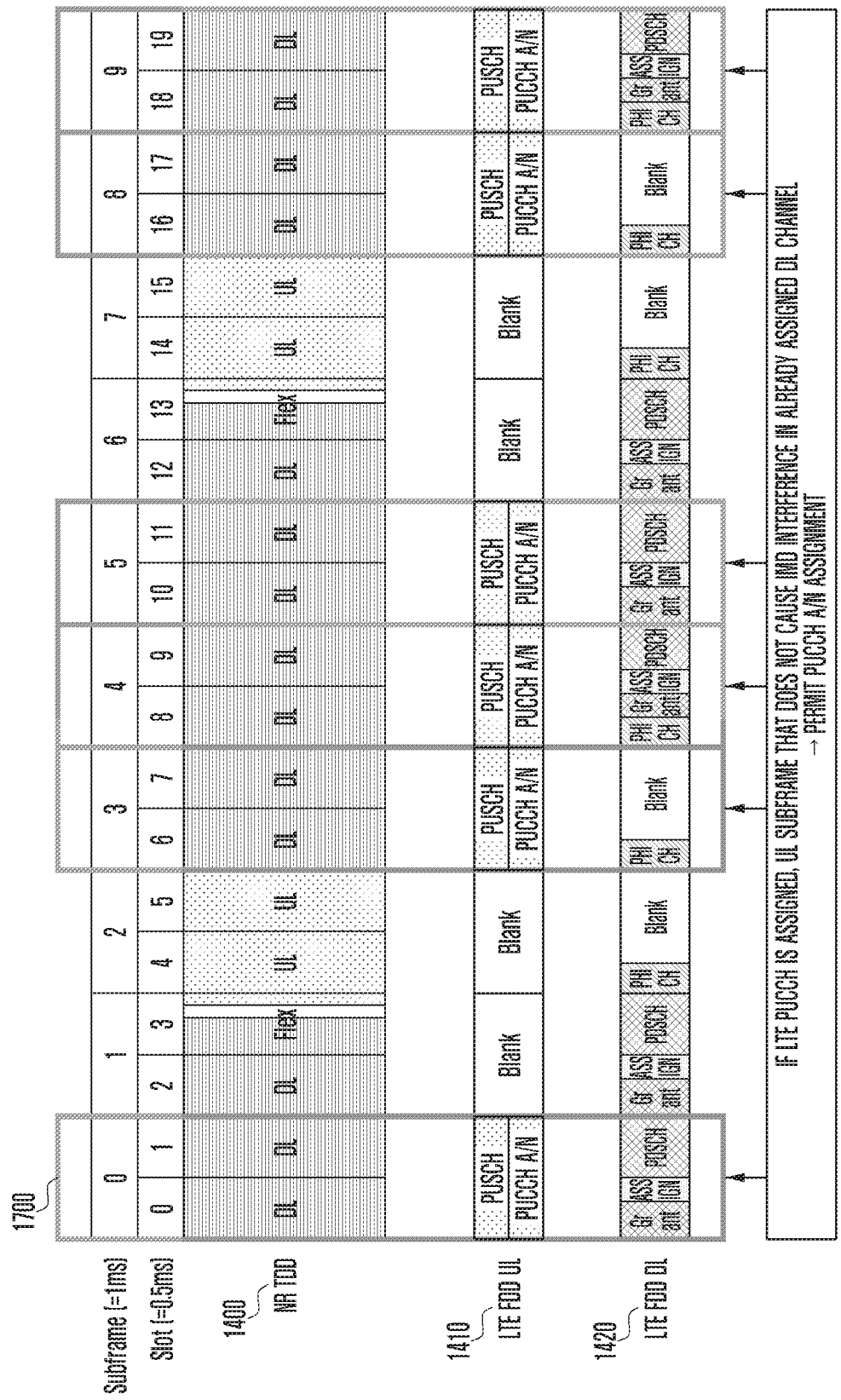
FIG. 17 is a diagram illustrating a detailed example of resource assignment based on a method of determining a DL transmission-related resource assignment pattern according to an embodiment of the disclosure.

Referring to FIG. 17, FIG. 17 is a diagram illustrating an example of assigning a PUCCH to an UL subframe in which IMD interference is not caused in a pre-assigned DL channel. A serving cell (or cell group) whose scheduling and resource assignment are restricted assigns a PUCCH to a subframe because IMD interference does not occur although PUCCHs are assigned to the subframes #0, #3, #4, #5, #8 and #9 1700 of the LTE FDD UL subframe 1410.

Figure 18:
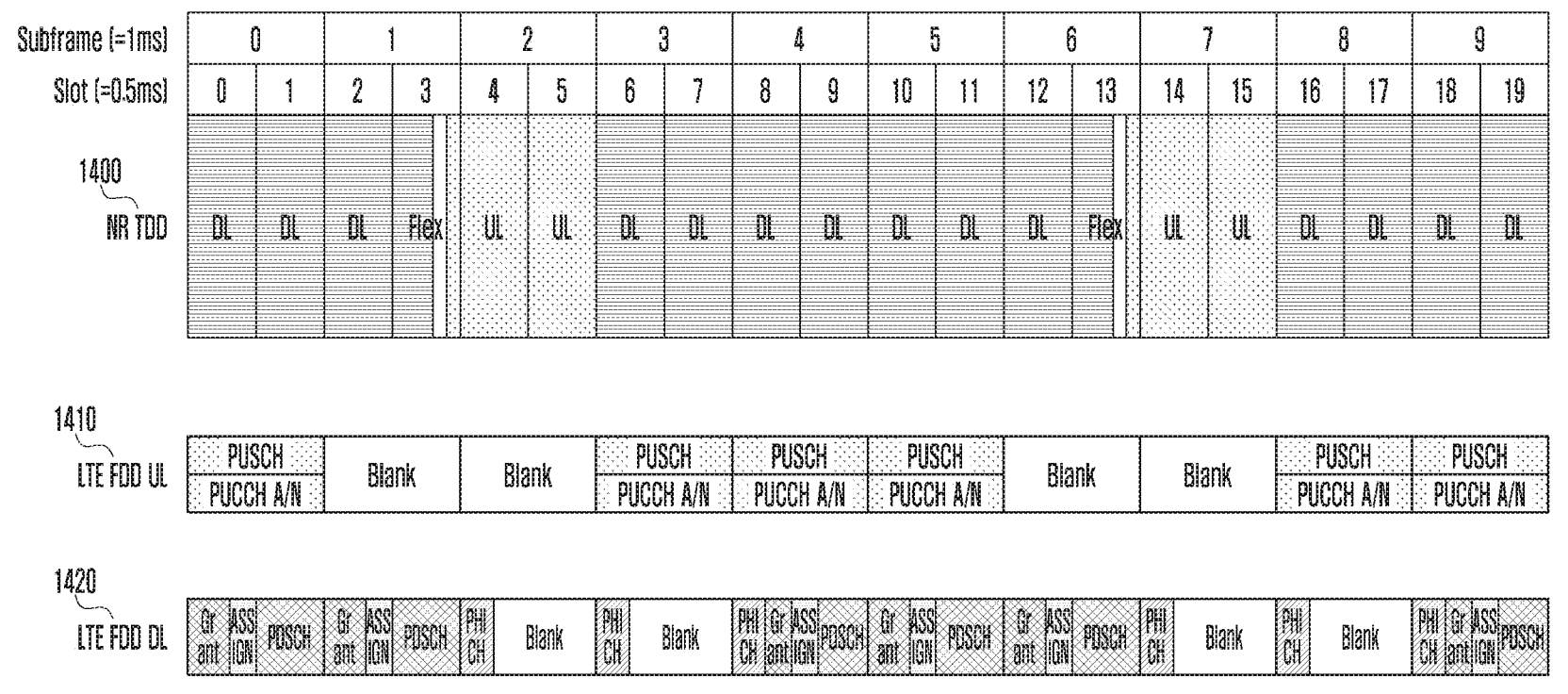

FIG. 18 is a diagram illustrating the resource assignment pattern of the finally determined UL transmission-related resource and DL transmission-related resource.

Referring to FIG. 18, in an LTE system, a PDSCH may be assigned to 60% of all subframes and a PUSCH may be assigned to 60% of all subframes, compared to a technology in which a PDSCH and PUSCH can be transmitted in all subframes of the related art.

The resource assignment pattern provided by the disclosure has the following characteristics. According to the resource assignment pattern, a serving cell (or cell group) whose scheduling and resource assignment are restricted permits some of resources capable of UL assignment for an UL channel and permits some of resources capable of DL assignment for a DL channel. Furthermore, both the PUSCH and the PUCCH have been assigned to the same subframe in the example of FIG. 18, but they may be mapped to different subframes. That is, both PUSCH and PUCCH transmission resources are present in a first subframe, but only a PUSCH transmission resource may be present in a second subframe and only a PUCCH transmission resource may be present in a third subframe. Furthermore, according to the resource assignment pattern, if the UL grant resource is present, the UL data resource corresponding to the UL grant is predetermined or present based on predetermined timing by a base station. If the DL assignment resource is present, the DL data corresponding to the DL assignment and an UL feedback information resource for the DL data are predetermined or present based on predetermined timing by a base station. Furthermore, according to the resource assignment pattern, the UL transmission-capable resource of a serving cell (or cell group) whose scheduling and resource assignment are unrestricted and the permitted UL channel resource of a serving cell (or cell group) whose scheduling and resource assignment are restricted do not overlap on a time domain. A DL channel resource that overlaps the UL transmission-capable resource of the serving cell (or cell group) whose scheduling and resource assignment are unrestricted on a time domain and that corresponds to the UL channel of the serving cell (or cell group) whose scheduling and resource assignment are restricted and may not be assigned.

The serving cell (or cell group) whose scheduling and resource assignment are restricted, which has determined the resource assignment pattern of an UL transmission-related resource and DL transmission-related resource using the above-described method, determines the assignment pattern of a resource and signal whose assignment pattern has not been determined in a serving cell (or cell group) whose scheduling and resource assignment are restricted. The resource and signal whose assignment pattern has not been determined means a resource and signal that need to be assigned in addition to the determined UL transmission scheduling resource, UL transmission resource, DL feedback resource for UL transmission, DL transmission scheduling resource, DL transmission resource, and UL feedback resource for DL transmission.

With respect to the resource and signal whose assignment pattern has not been determined, the serving cell (or cell group) whose scheduling and resource assignment are restricted needs to determine the resource assignment pattern so that resource assignment and signal transmission and reception can be performed, while preventing IMD interference from being received in a subframe (or slot) to which resource assignment has been permitted, based on the determined resource assignment pattern. To this end, when the resource and signal whose assignment pattern has not been determined (hereinafter referred to as a "non-determined resource and signal) is assigned, the serving cell (or cell group) whose scheduling and resource assignment are restricted may change a parameter to determine the resource of the non-determined resource and signal so that the resource of the non-determined resource and signal is included in a predetermined resource assignment pattern. For example, the serving cell (or cell group) whose scheduling and resource assignment are restricted may set a cycle or offset value indicative of a resource in which a non-determined signal is transmitted based on a predetermined resource assignment pattern.

If it is difficult to determine a resource assignment pattern while maintaining a predetermined resource assignment pattern due to an assignment characteristic (e.g., if the pattern is periodically assigned or assigned at a predetermined location or a service provider wants resource assignment to a specific location) of a resource and signal whose assignment pattern has not been determined, a serving cell (or cell group) whose scheduling and resource assignment are restricted may determine a resource assignment pattern so that all of a resource whose assignment pattern has been predetermined and a resource and signal whose assignment pattern has not been determined can be allocated without the influence of IMD interference, while partially changing the existing assignment pattern. In order to determine the resource and signal assignment pattern in this operation, the method used to determine an UL transmission-related resource and a DL transmission-related resource may be similarly applied. In embodiments of the disclosure, a resource and signal whose assignment pattern has not been determined may mean transmission according to periodic channel state information (P-CSI) reporting, a scheduling request (SR), a physical broadcast channel (PBCH), a positioning reference signal (PRS), a channel state information reference signal (CSI-RS), a sounding reference signal (SRS), system information (system information block (SIB)), paging, a signaling radio bearer (SRB), an internet protocol (IP) multimedia subsystem (IMS), and evolved multimedia broadcast multicast Services (eMBMS) in an LTE system.

Thereafter, the serving cell (or cell group) whose scheduling and resource assignment are restricted may determine whether to always apply resource assignment restriction according to the determined resource assignment pattern to a terminal that may receive IMD interference. If the resource assignment restriction is determined to be always applied based on the resource assignment pattern, when the terminal accesses the base station using a frequency combination in which IMD interference may occur, the serving cell (or cell group) whose scheduling and resource assignment are restricted always performs the resource assignment restriction based on the resource assignment pattern regardless of whether IMD interference has actually occurred in the terminal. In embodiments of the disclosure, whether to always apply resource assignment restriction based on a resource assignment pattern to a terminal that may receive IMD interference may be determined by a base station operator.

An operation performed when a terminal first reports information on whether IMD interference occurs to a base station or if information on whether IMD interference occurs, reported to a base station by a terminal, is changed is described below.

Figure 19:
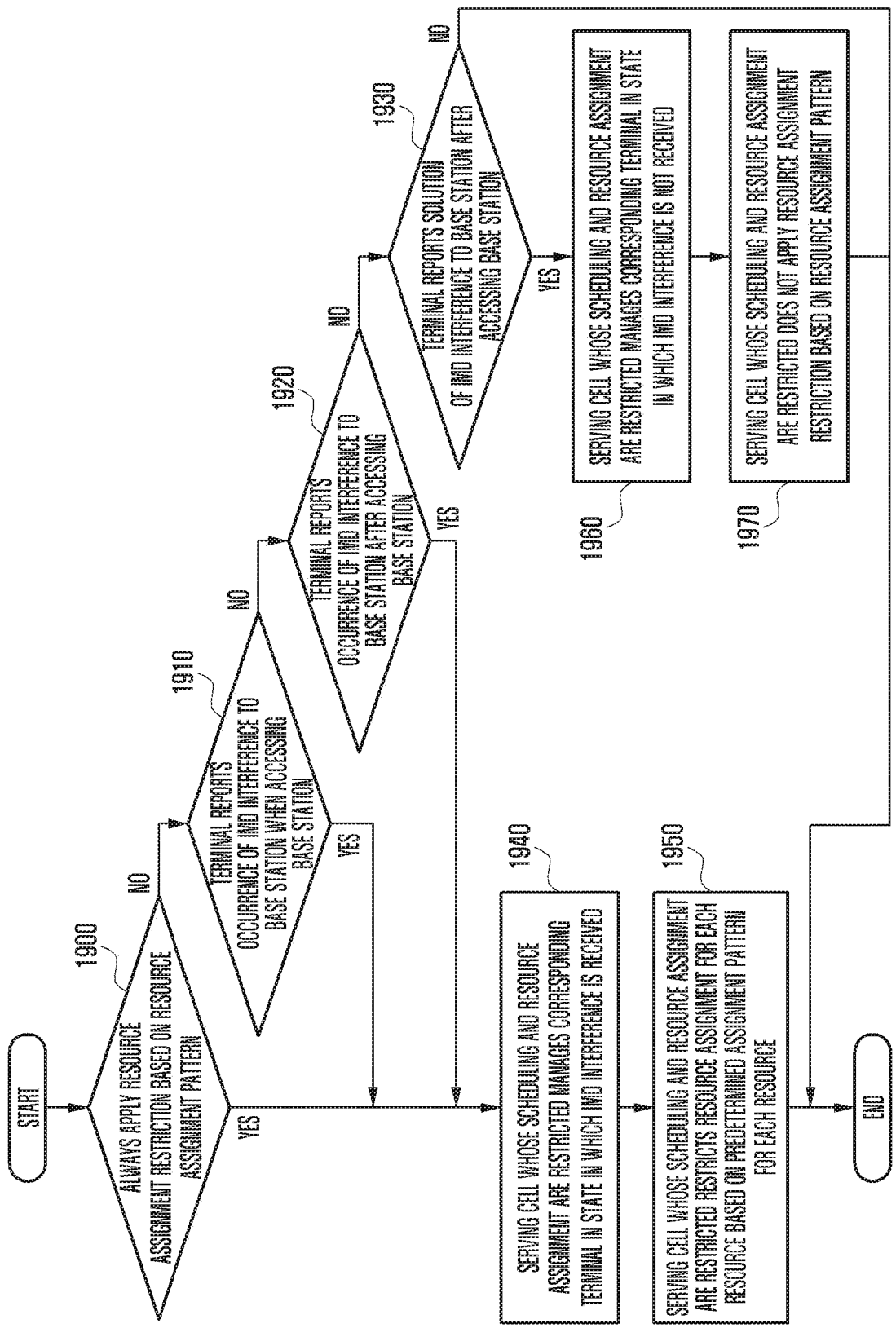
FIG. 19 is a diagram illustrating an operation of a base station when a terminal first reports information on whether IMD interference occurs to the base station or if information on whether IMD interference occurs, reported to the base station by the terminal, is changed according to an embodiment of the disclosure.

FIG. 19 is a diagram illustrating an operation of a base station when a terminal first reports information on whether IMD interference occurs to the base station or if information on whether IMD interference occurs, reported to the base station by the terminal, is changed according to an embodiment of the disclosure.

Referring to FIG. 19, FIG. 19 illustrates a configuration in which a serving cell (or cell group) whose scheduling and resource assignment are restricted performs resource assignment based on a resource assignment pattern if the serving cell (or cell group) whose scheduling and resource assignment are restricted applies, to a specific terminal, resource assignment restriction based on the resource assignment pattern, the serving cell (or cell group) whose scheduling and resource assignment are restricted performs resource assignment based on a resource assignment pattern when a specific terminal reports the occurrence of IMD interference if the serving cell (or cell group) whose scheduling and resource assignment are restricted conditionally applies resource assignment restriction based on the resource assignment pattern to the terminal, the serving cell (or cell group) whose scheduling and resource assignment are restricted follows restriction without any change (i.e., whether resource assignment restriction is applied or not applied is not determined) of the related art when a terminal reports no information, and the serving cell (or cell group) whose scheduling and resource assignment are restricted performs resource assignment without applying resource assignment restriction if a terminal does not report the occurrence of IMD interference and reports the solution of IMD interference.

The serving cell (or cell group) whose scheduling and resource assignment are restricted determines whether resource assignment restriction based on a resource assignment pattern has been determined to be always applied at operation 1900. The serving cell (or cell group) whose scheduling and resource assignment are restricted performs operation 1910 if the resource assignment restriction based on the resource assignment pattern has been determined to be not always applied, and performs operation 1940 if the resource assignment restriction based on the resource assignment pattern has been determined to be always applied.

At operation 1910, the serving cell (or cell group) whose scheduling and resource assignment are restricted determines whether a terminal has reported the occurrence of IMD interference to the base station when the terminal accesses the base station. The serving cell (or cell group) whose scheduling and resource assignment are restricted performs operation 1920 if the terminal has not reported the occurrence of IMD interference to the base station when the terminal accesses the base station, and performs operation 1940 if the terminal has reported the occurrence of IMD interference to the base station when the terminal accesses the base station.

At operation 1920, the serving cell (or cell group) whose scheduling and resource assignment are restricted determines whether the terminal has reported the occurrence of IMD interference to the base station after accessing the base station. The serving cell (or cell group) whose scheduling and resource assignment are restricted performs operation 1930 if the terminal has not reported the occurrence of IMD interference to the base station after accessing the base station, and performs operation 1940 if the terminal has reported the occurrence of IMD interference to the base station after accessing the base station.

At operation 1930, the serving cell (or cell group) whose scheduling and resource assignment are restricted determines whether the terminal has reported the solution of IMD interference to the base station after accessing the base station. The reporting of the solution of IMD interference may be information indicating that IMD interference has occurred, but has been solved or information indicating that IMD interference has not occurred. The serving cell (or cell group) terminates the operation without an additional operation if the terminal has not reported the solution of IMD interference to the base station after accessing the base station. If the terminal has reported the solution of IMD interference to the base station after accessing the base station, the serving cell (or cell group) whose scheduling and resource assignment are restricted performs operation 1960.

Operation 1940 is an operation for the serving cell (or cell group) whose scheduling and resource assignment are restricted to manage a corresponding terminal in a serving cell (or cell group) whose scheduling and resource assignment are restricted in the state in which IMD interference is received. In this operation, the serving cell (or cell group) whose scheduling and resource assignment are restricted manages the corresponding terminal in the state in which IMD interference is received, and performs operation 1950.

Operation 1950 is an operation for the serving cell (or cell group) whose scheduling and resource assignment are restricted to restrict resource assignment for each resource based on a resource assignment pattern previously determined for a corresponding terminal. In this operation, the serving cell (or cell group) whose scheduling and resource assignment are restricted operates to restrict resource assignment for each resource based on a resource assignment pattern determined for a corresponding terminal. That is, the serving cell (or cell group) whose scheduling and resource assignment are restricted assigns the UL and DL transmission-related resource of the terminal based on the determined resource assignment pattern upon performing terminal scheduling. That is, the serving cell (or cell group) whose scheduling and resource assignment are restricted assigns resources so that an UL transmission resource and an UL feedback resource for DL transmission are included in an UL resource assigned in a resource assignment pattern, and assigns resources so that an UL transmission scheduling resource, DL transmission scheduling resource, DL transmission resource and DL feedback resource for UL transmission are included in a DL resource assigned in a resource assignment pattern.

Operation 1960 is an operation for the serving cell (or cell group) whose scheduling and resource assignment are restricted to manage a corresponding terminal in the state in which IMD interference is not received. The serving cell (or cell group) whose scheduling and resource assignment are restricted manages the corresponding terminal in the state in which IMD interference is not received, and performs operation 1970.

Operation 1970 is an operation for the serving cell (or cell group) whose scheduling and resource assignment are restricted to not apply resource assignment restriction based on a resource assignment pattern to a corresponding terminal. The serving cell (or cell group) whose scheduling and resource assignment are restricted operates to not restrict resource assignment for the corresponding terminal based on the resource assignment pattern. That is, although a determined resource assignment pattern is present, the serving cell (or cell group) whose scheduling and resource assignment are restricted assigns the UL and DL transmission-related resource of the terminal without being limited to the determined resource assignment pattern.

The operations illustrated in FIG. 19 do not need to be sequentially performed in the sequence illustrate din FIG. 19. The order of the operations may be changed or the operations may be omitted, and such a change or omission may be construed as being included in the scope of the disclosure if there is an effect intended by the disclosure by the change or omission.

Figure 20:
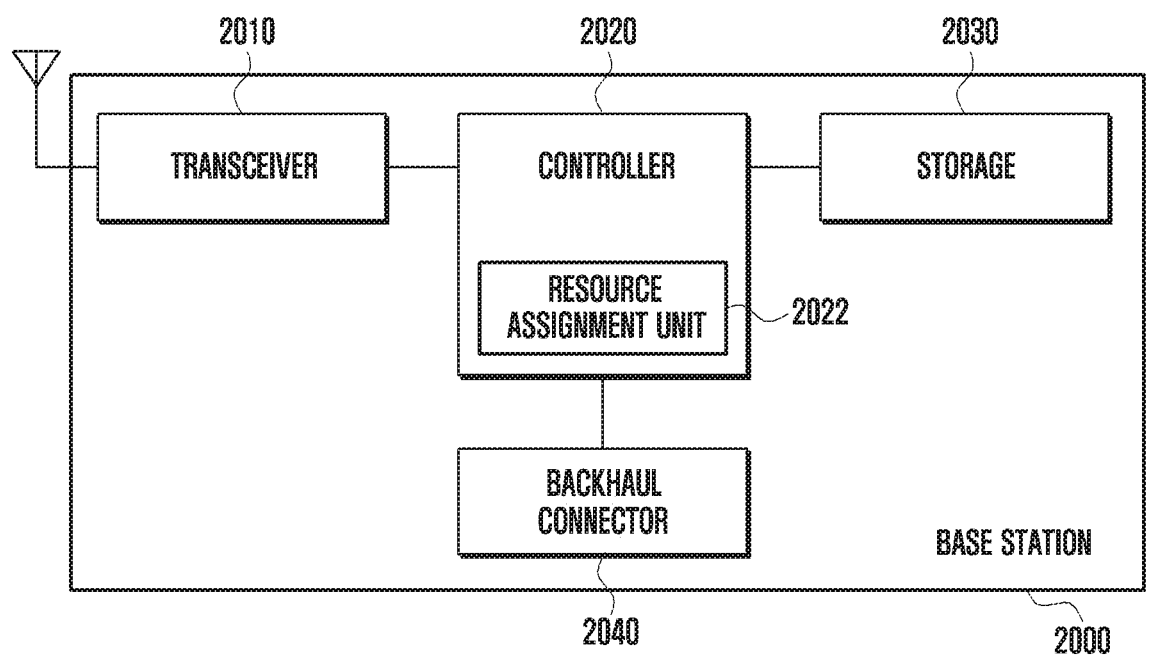
FIG. 20 is a block diagram of a base station apparatus according to an embodiment of the disclosure.

FIG. 20 is a block diagram of a base station apparatus capable of performing the disclosure according to an embodiment of the disclosure.

Referring to FIG. 20, a base station 2000 may be configured with a transceiver 2010, a controller 2020, a storage 2030 and a backhaul connector 2040. The transceiver may transmit and receive signals to and from a terminal. The signal may include control information and data. To this end, the transceiver 2010 may be configured with a radio frequency (RF) transmitter for up-converting and amplifying the frequency of a transmitted signal and an RF receiver for low-noise-amplifying a received signal and down-converting the frequency of the signal. Furthermore, the transceiver 2010 may obtain a signal through a radio channel, may output the signal to the controller 2020, and may transmit a signal output by the controller 2020 through a radio channel. The backhaul connector 2040 may transmit and receive signals to and from another base station that controls another cell group and a core network. The signal may include control information and data.

The controller 2020 controls the transceiver 2010 and the backhaul connector 2040 to perform the embodiment described in the disclosure. The controller 2020 may include a resource assignment unit 2022. Specifically, the controller 2020 identifies and provides information for investigating a resource assignment pattern, transmits and receives information for determining a resource assignment pattern along with another base station through the backhaul connector 2040, and determines a resource assignment pattern based on the information for determining the resource assignment pattern as described above. Thereafter, the resource assignment unit 2022 determines a resource to be assigned to a terminal based on the resource assignment pattern. Furthermore, the controller 2020 may determine whether a plurality of frequency bands additionally used by a terminal is frequency bands in which IMD interference occurs, may determine the assignment pattern of a resource and signal whose assignment pattern has not been determined, and may determine whether to apply resource assignment restriction based on a resource assignment pattern to a specific terminal. Furthermore, the controller 2020 may control the storage 2030 to store the determined resource assignment pattern.

Figure 21:
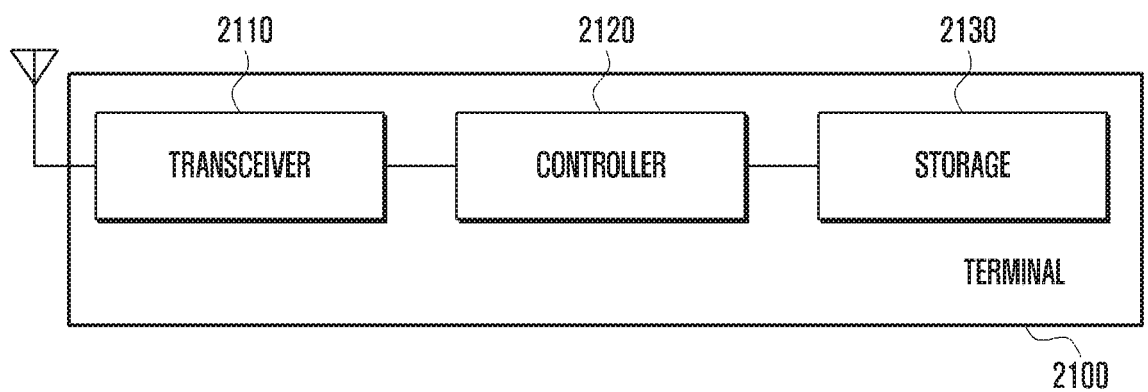
FIG. 21 is a block diagram of a terminal apparatus according to an embodiment of the disclosure.

FIG. 21 is a block diagram of a terminal apparatus capable of performing the disclosure according to an embodiment of the disclosure.

Referring to FIG. 21, a terminal 2100 may be configured with a transceiver 2110, a controller 2120 and a storage 2130. The transceiver may transmit and receive signals to and from a base station. The signal may include control information and data. To this end, the transceiver 2110 may be configured with an RF transmitter for up-converting and amplifying the frequency of a transmitted signal and an RF receiver for low-noise-amplifying a received signal and down-converting the frequency of the signal. Furthermore, the transceiver 2110 may receive a signal through a radio channel, may output the signal to the controller 2120, and may transmit a signal output by the controller 2120 through a radio channel. The transceiver 2110 receives a resource assignment signal from a base station. The resource assignment signal may be information indicative of an UL grant, DL assignment and other signal transmission resource. The controller 2120 transmits and receives UL and DL signals in response to the resource assignment signal.

According to one embodiment of the disclosure, there are effects in that transmission and reception performance of a terminal and a base station can be improved and the data transmission and reception rate of a user terminal can be increased by controlling overall interference, such as harmonic interference and IMD interference which may occur in a terminal or a base station, in a mobile communication system supporting a carrier aggregation or dual/multi-connectivity technology in which a plurality of frequency resources is used at the same time through the disclosure. Furthermore, according to the disclosure, a terminal does not transmit ACK/NACK information for DL data using the PUCCH format 3 by bundling the ACK/NACK information, but can transmit ACK/NACK information generated for each DL subframe because a base station can secure a sufficient amount of UL resources. A base station implementation is facilitated and a resource for the limited PUCCH format 3 can be efficiently used when the transmission and reception implementation of bundled ACK/NACK information is difficult.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A first base station in a wireless communication system, comprising:
    a transceiver; and
    a processor connected to the transceiver and configured to:
        obtain resource information of a second base station transmitted by the second base station,
        determine a resource assignment pattern based on the resource information of the second base station,
    wherein the resource assignment pattern is determined by:
        restricting an assignment of a resource for an uplink (UL) grant, UL data corresponding to the UL grant, and downlink (DL) feedback information for the UL data based on whether intermodulation distortion (IMD) interference will be present in the UL grant corresponding to the UL data, and
        restricting an assignment of a resource for the DL feedback information, the UL data corresponding to the DL feedback information, and the UL grant corresponding to the UL data based on whether IMD interference will be present in the DL feedback information resource for the UL data,
    wherein the first base station and the second base station control different cell groups and are capable of simultaneously transmitting and receiving signals to and from a terminal,
    wherein the resource information of the second base station comprises at least one of information indicating of an UL transmission-capable resource of the second base station and information indicating of a DL transmission-capable resource of the second base station, and
    wherein the resource assignment pattern is for reducing interference by permitting some of UL assignment-capable resources of the first base station for an UL channel and permitting some of DL assignment-capable resources of the first base station for a DL channel.

2. The first base station of claim 1, wherein the processor is configured to further control to:
    in case that the terminal is scheduled, determine a resource of an UL channel of the terminal to be included in a resource of an UL channel of the resource assignment pattern, and
    determine a resource of a DL channel of the terminal to be included in a resource of a DL channel of the resource assignment pattern.

3. The first base station of claim 1,
    wherein the UL channel comprises a physical uplink control channel (PUCCH) or a physical uplink shared channel (PUSCH), and
    wherein the PUCCH and PUSCH are located in independent resources in a time domain based on the resource assignment pattern.

4. The first base station of claim 1, wherein the DL channel comprises a physical downlink channel (PDCCH) or a physical downlink shared channel (PDSCH).

5. The first base station of claim 1,
    wherein the resource assignment pattern comprises an UL transmission resource and a DL transmission resource,
    wherein the UL transmission resource includes at least one of the UL grant, the UL data, and the DL feedback information for the UL data, and
    wherein the DL transmission resource is for at least one of DL assignment, DL data, and UL feedback information for the DL data.

6. The first base station of claim 5, wherein the processor is further configured to:
    determine whether the UL grant is present in the resource assignment pattern,
    in case that the UL grant is present, the UL data corresponding to the UL grant is present based on a predetermined timing,
    determine whether the DL assignment is present in the resource assignment pattern, and
    in case that the DL assignment is present, the DL data corresponding to the DL assignment and the UL feedback information for the DL data are present based on another predetermined timing.

7. The first base station of claim 1, wherein:
    according to the resource assignment pattern, the UL transmission-capable resource of the second base station and the permitted UL channel resource of the first base station do not overlap on a time domain, and
    a DL channel resource, corresponding to an UL channel overlaps with the UL transmission-capable resource of the second base station on the time domain, is not assigned.

8. A second base station in a wireless communication system, comprising:
    a transceiver; and
    a processor connected to the transceiver and configured to control to:
        identify resource information of the second base station, and transmit the resource information used for determining a resource assignment pattern to a first base station, wherein the resource assignment pattern is determined by:
  restricting an assignment of a resource for an uplink (UL) grant, UL data corresponding to the UL grant, and downlink (DL) feedback information for the UL data based on whether intermodulation distortion (IMD) interference will be present in the UL grant corresponding to the UL data, and
  restricting an assignment of a resource for the DL feedback information, the UL data corresponding to the DL feedback information, and the UL grant corresponding to the UL data based on whether IMD interference will be present in the DL feedback information resource for the UL data, wherein the first base station and the second base station control different cell groups and are capable of simultaneously transmitting and receiving signals to and from a terminal simultaneously, and wherein the resource information of the second base station comprises at least one of information indicating of an UL transmission-capable resource of the second base station and information indicating of a DL transmission-capable resource of the second base station.

9. A base station in a wireless communication system, comprising:
  a transceiver; and
  a processor connected to the transceiver and configured to:
    obtain resource information,
    determine a resource assignment pattern based on the resource information, and
    schedule a terminal based on the resource assignment pattern,
  wherein the resource assignment pattern is determined by:
    restricting an assignment of a resource for an uplink (UL) grant, UL data corresponding to the UL grant, and downlink (DL) feedback information for the UL data based on whether intermodulation distortion (IMD) interference will be present in the UL grant corresponding to the UL data, and
    restricting an assignment of a resource for the DL feedback information, the UL data corresponding to the DL feedback information, and the UL grant corresponding to the UL data based on whether IMD interference will be present in the DL feedback information resource for the UL data,
  wherein the resource assignment pattern comprises time-frequency resources that an UL channel and a DL channel are capable of being allocated during a specific time interval, and
  wherein the resource assignment pattern is for reducing interference by assigning some of UL resources for an UL channel and assigning some of DL resources for a DL channel.

10. The base station of claim 9,
  wherein the UL channel comprises a physical uplink control channel (PUCCH) and a physical uplink shared channel (PUSCH), and
  wherein the PUCCH and PUSCH are located in independent resources in a time domain based on the resource assignment pattern.

11. The base station of claim 9, wherein the DL channel comprises a physical downlink channel (PDCCH) and a physical downlink shared channel (PDSCH).

12. The base station of claim 9,
  wherein the resource assignment pattern comprises an UL transmission resource and a DL transmission resource,
  wherein the UL transmission resource includes at least one of the UL grant, the UL data, and the DL feedback information for the UL data, and
  wherein the DL transmission resource includes at least one of DL assignment, DL data, and UL feedback information for the DL data.

13. The base station of claim 12, wherein the processor is further configured to:
  determine whether the UL grant is present in the resource information,
  in case that the UL grant is present, the UL data resource corresponding to the UL grant is present based on a predetermined timing,
  determine whether the DL assignment resource is present in the resource information, and
  in case that the DL assignment is present, the DL data corresponding to the DL assignment and the UL feedback information for the DL data are present based on another predetermined timing.

14. The base station of claim 12, wherein the processor is further configured to further control to:
  determine a resource assignment pattern of an UL transmission resource of the base station based on the resource information, and
  determine a resource assignment pattern of a DL transmission resource of the base station based on the resource assignment pattern of the UL transmission resource.

15. The base station of claim 14, wherein the processor is further configured to determine an undetermined resource assignment pattern of a channel and signal based on the UL transmission resource and the DL transmission resource of the base station.

16. The base station of claim 14, wherein the processor is further configured to:
  determine to assign the DL assignment and a DL data resource to a time resource in which IMD interference is not received based on a resource assignment pattern of an UL transmission resource of the base station,
  determine to assign an UL feedback information resource for the DL data in case that there is no possibility that IMD interference is to be present in the UL feedback information resource for the DL data corresponding to the assigned DL data resource, and
  determine to restrict pre-assigned DL data and a corresponding DL assignment resource in case that there is a possibility that IMD interference is to be present in the UL feedback information resource for the DL data.

17. The base station of claim 9, wherein the processor is configured to:
  determine a resource of an UL channel for the terminal to be included in a resource of the UL channel in the resource assignment pattern, and
  determine a resource of a DL channel for the terminal to be included in a resource of the DL channel in the resource assignment pattern.

18. The base station of claim 9,
  wherein the processor is further configured to transmit scheduling information to the terminal, and
  wherein the scheduling information indicates an UL channel resource and a DL channel resource for the terminal.

19. The base station of claim 9,
  wherein the processor is further configured to obtain the resource information from another base station, and wherein the resource information comprises at least one of subcarrier spacing information of the other base station, bitmap information of an UL transmission resource of the other base station, or bitmap information of a DL transmission resource of the other base station.

20. The base station of claim 9, wherein the processor is further configured to determine whether a resource assignment restriction based on the resource assignment pattern is applied to the terminal.

\* \* \* \* \*